(12) United States Patent
Ohishi

(10) Patent No.: US 10,293,660 B2
(45) Date of Patent: May 21, 2019

(54) INTEGRATED VALVE AND HEAT PUMP CYCLE

(71) Applicant: DENSO CORPORATION, Kariya, Aichi-pref. (JP)

(72) Inventor: Shigeji Ohishi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/542,770

(22) PCT Filed: Jan. 29, 2016

(86) PCT No.: PCT/JP2016/052648
§ 371 (c)(1),
(2) Date: Jul. 11, 2017

(87) PCT Pub. No.: WO2016/125697
PCT Pub. Date: Aug. 11, 2016

(65) Prior Publication Data
US 2018/0009291 A1   Jan. 11, 2018

(30) Foreign Application Priority Data

Feb. 4, 2015 (JP) .................................. 2015-020067

(51) Int. Cl.
*B60H 1/00* (2006.01)
*B60H 1/22* (2006.01)
(Continued)

(52) U.S. Cl.
CPC ........... *B60H 1/22* (2013.01); *B60H 1/00485* (2013.01); *B60H 1/00907* (2013.01);
(Continued)

(58) Field of Classification Search
CPC . B60H 1/00485; B60H 1/00921; F25B 13/00; F25B 41/04; F25B 2400/23
See application file for complete search history.

(56) References Cited

U.S. PATENT DOCUMENTS 5,722,257 A    3/1998 Ishii et al.
5,778,691 A *  7/1998 Suzuki ............... B60H 1/00907
                                                              62/160
(Continued)

FOREIGN PATENT DOCUMENTS

JP    H09105386 A    4/1997
JP    2012181005 A    9/2012
(Continued)

*Primary Examiner* — Kun Kai Ma
(74) *Attorney, Agent, or Firm* — Harness, Dickey & Pierce, P.L.C.

(57) ABSTRACT

An integrated valve includes a connecting member including a first valve element and a second valve element. The first valve element is disposed in a pressure reducing chamber of a body of the integrated valve and forms a pressure reducing valve that reduces the pressure of the refrigerant discharged from a compressor. The second valve element is disposed in an on-off valve chamber of the body and forms an on-off valve for adjusting a flow rate of the refrigerant flowing into an intermediate-pressure port of the compressor. The on-off valve is in a fully opened state when the pressure reducing valve is in a throttling state, the on-off valve is in an opened state when the pressure reducing valve is in an opened state, and the on-off valve is in a closed state when the pressure reducing valve is in a fully opened state.

4 Claims, 12 Drawing Sheets

COOLING OPERATION MODE

(51) Int. Cl.
*B60H 1/32* (2006.01)
*F25B 1/10* (2006.01)
*F25B 5/04* (2006.01)
*F25B 6/04* (2006.01)
*F25B 9/00* (2006.01)
*F25B 13/00* (2006.01)
*F25B 41/04* (2006.01)
*F25B 41/06* (2006.01)
*F25B 43/00* (2006.01)
*F25B 45/00* (2006.01)

(52) U.S. Cl.
CPC ........... *B60H 1/00921* (2013.01); *B60H 1/32* (2013.01); *F25B 1/10* (2013.01); *F25B 13/00* (2013.01); *F25B 41/04* (2013.01); *F25B 41/06* (2013.01); *F25B 43/00* (2013.01); *F25B 45/00* (2013.01); *F25B 5/04* (2013.01); *F25B 6/04* (2013.01); *F25B 9/008* (2013.01); *F25B 2400/0409* (2013.01); *F25B 2400/121* (2013.01); *F25B 2400/13* (2013.01); *F25B 2400/23* (2013.01); *F25B 2500/18* (2013.01); *F25B 2600/2501* (2013.01)

(56) References Cited

U.S. PATENT DOCUMENTS

| | | | | |
|---|---|---|---|---|
| 5,934,094 A * | 8/1999 | Itoh | ............... | B60H 1/3205 62/160 |
| 5,996,360 A * | 12/1999 | Tanaka | ............... | B60H 1/00907 62/159 |
| 6,047,770 A * | 4/2000 | Suzuki | ............... | B60H 1/00007 165/202 |
| 6,293,123 B1 * | 9/2001 | Iritani | ............... | B60H 1/3205 62/197 |
| 6,347,528 B1 * | 2/2002 | Iritani | ............... | B60H 1/00357 62/323.1 |
| 2012/0266622 A1 * | 10/2012 | Inaba | ............... | B60H 1/00899 62/186 |
| 2012/0266624 A1 * | 10/2012 | Inaba | ............... | B60H 1/00899 62/324.6 |
| 2013/0055751 A1 * | 3/2013 | Inaba | ............... | B60H 1/2218 62/498 |
| 2013/0312447 A1 * | 11/2013 | Inaba | ............... | F25B 43/00 62/324.6 |
| 2014/0238067 A1 * | 8/2014 | Itou | ............... | F25B 41/04 62/324.6 |
| 2014/0290772 A1 * | 10/2014 | Itou | ............... | F25B 41/062 137/625.12 |
| 2014/0318170 A1 * | 10/2014 | Katoh | ............... | F28F 9/26 62/324.5 |
| 2015/0176868 A1 * | 6/2015 | Kayano | ............... | F25B 1/06 62/324.6 |
| 2016/0068047 A1 * | 3/2016 | Kobayashi | ............... | F25B 5/04 62/401 |
| 2016/0222965 A1 * | 8/2016 | Ohno | ............... | F04C 23/001 |
| 2016/0244052 A1 * | 8/2016 | Hirabayashi | ............... | B60K 6/445 |
| 2016/0297283 A1 * | 10/2016 | Sakamoto | ............... | F25B 47/02 |
| 2018/0009291 A1 * | 1/2018 | Ohishi | ............... | B60H 1/22 |
| 2018/0022184 A1 * | 1/2018 | Ohyama | ............... | B60L 1/003 62/231 |
| 2018/0022185 A1 * | 1/2018 | Kawano | ............... | B60H 1/22 165/202 |
| 2018/0201094 A1 * | 7/2018 | Kawano | ............... | F25B 1/00 |
| 2018/0202442 A1 * | 7/2018 | Nakamoto | ............... | F04B 49/02 |

FOREIGN PATENT DOCUMENTS

| | | |
|---|---|---|
| JP | 2013092354 A | 5/2013 |
| JP | 2013092355 A | 5/2013 |
| JP | 2014070867 A | 4/2014 |
| JP | 2014231948 A | 12/2014 |
| JP | 2015017763 A | 1/2015 |
| JP | 2015045453 A | 3/2015 |
| WO | WO-2016072070 A1 | 5/2016 |

* cited by examiner

COOLING OPERATION MODE

FIRST HEATING OPERATION MODE

SECOND HEATING OPERATION MODE

COOLING OPERATION MODE

FIRST HEATING MODE OF HEATING OPERATION MODE

SECOND HEATING MODE OF HEATING OPERATION MODE

TO FIRST BYPASS PASSAGE AND FIXED THROTTLE

INTEGRATED VALVE AND HEAT PUMP CYCLE

CROSS REFERENCE TO RELATED APPLICATIONS

This application is a U.S. National Phase Application under 35 U.S.C. 371 of International Application No. PCT/JP2016/052648 filed on Jan. 29, 2016 and published in Japanese as WO 2016/125697 A1 on Aug. 11, 2016. This application is based on and claims the benefit of priority from Japanese Patent Application No. 2015-020067 filed on Feb. 4, 2015. The entire disclosures of all of the above applications are incorporated herein by reference.

TECHNICAL FIELD

The present disclosure relates to an integrated valve and a heat pump cycle.

BACKGROUND ART

Up to now, as an air conditioning apparatus applied to a vehicle making it difficult to secure a heating source for heating in a vehicle interior such as an electric vehicle, there is a type in which heating in the vehicle interior is performed with the use of a high-temperature and high-pressure refrigerant discharged from a compressor of a heat pump cycle (in other words, a vapor compression refrigeration cycle) as a heat source.

As the heat pump cycle of this type, a gas injection cycle (that is, an economizer refrigeration cycle) in which a pressure of the refrigerant is reduced in two stages between a radiator and an evaporator and a gas-phase refrigerant which is a part of an intermediate-pressure refrigerant is merged with the refrigerant of a compression process in the compressor has been known.

For example, Patent Document 1 discloses a heat pump cycle that switches from a normal cycle to a gas injection cycle during a heating operation in order to improve COP (coefficient of performance) which is a coefficient of performance of a cycle during the heating operation. In this example, the normal cycle is a one-stage compression cycle, and the gas injection cycle is a two-stage compression cycle.

More specifically, the heat pump cycle of Patent Document 1 includes first and second pressure reducing portions that reduce a pressure of a refrigerant flowing out from a radiator, a gas-liquid separator that separates gas and liquid of an intermediate-pressure refrigerant whose pressure is reduced by the first pressure reducing portion, an evaporator that evaporates the refrigerant whose pressure is reduced in the first pressure reducing portion, and the like.

In the heat pump cycle, an on-off valve for opening and closing an intermediate-pressure refrigerant passage that leads a gas-phase refrigerant separated by the gas-liquid separator to an intermediate-pressure port of the compressor is disposed in the refrigerant passage. With such a configuration, the heat pump cycle is switched between a gas injection cycle and a normal cycle other than the gas injection cycle.

In this example, when the heat pump cycle functions as the normal cycle, the second pressure reducing portion is set to a fully opened state in which a pressure reducing action is not exerted. On the other hand, when the heat pump cycle functions as the gas injection cycle, in order to reduce the pressure of the refrigerant flowing out from the radiator in two stages, both of the first and second pressure reducing portions are set to a throttling state in which the pressure reducing action is exerted.

Under the circumstances, in Patent Document 1, the on-off valve for opening and closing the intermediate-pressure refrigerant passage is configured by a differential pressure valve. The differential pressure valve opens the intermediate-pressure refrigerant passage when a differential pressure across the second pressure reducing portion becomes equal to or higher than a predetermined differential pressure. As a result, the cycle configuration of the heat pump cycle is simplified.

Further, Patent Document 2 discloses an example in which the compressor is configured by a scroll-type compressor in the heat pump cycle functioning as the gas injection cycle. More specifically, in Patent Document 2, the intermediate-pressure port is formed in an end plate portion of a fixed scroll, and the intermediate-pressure port is periodically opened and closed by a tooth tip of a movable scroll which is abutted against an end plate portion of a fixed scroll, to thereby merge the intermediate-pressure refrigerant and a refrigerant being in a compression process together.

PRIOR ART DOCUMENT

Patent Document

Patent Document 1: JP 2012-181005 A
Patent Document 2: JP H09-105386 A

SUMMARY

Incidentally, if the compressor disclosed in Patent Document 2 is applied to the heat pump cycle that is switchable between the gas injection cycle and the normal cycle disclosed in Patent Document 1, it has been found that the following difficulties occur during a refrigerant filling operation for filling the refrigerant into the cycle.

(1) A case in which the intermediate-pressure refrigerant passage cannot be drawn to vacuum in an evacuating process.

(2) A case in which the intermediate-pressure refrigerant passage cannot be filled with the refrigerant in a filling process.

The present inventors have conducted intensive studies on the above-described difficulties (1) and (2), as a result of which, causes of the respective difficulties (1) and (2) have been clarified.

In view of the foregoing points, it is an object of the present disclosure to reliably perform evacuating of an intermediate-pressure refrigerant passage in an evacuating process and filling of the intermediate-pressure refrigerant passage with a refrigerant in a filling process in a heat pump cycle which is switchable between a gas injection cycle and a normal cycle.

In order to achieve the above-described object, according to one aspect of the present disclosure, an integrated valve includes: a body having a pressure reducing chamber in which a pressure of refrigerant discharged from a compressor is reduced, and an on-off valve chamber in which a flow channel of the refrigerant flowing into an intermediate-pressure port through an intermediate-pressure refrigerant passage and through a check valve is opened or closed; a connecting member including a first valve element that is disposed in the pressure reducing chamber and forms a pressure reducing valve that reduces the pressure of the refrigerant discharged from the compressor, and a second valve element disposed in the on-off valve chamber and forming an on-off valve that adjusts a flow rate of the refrigerant flowing into the intermediate-pressure port, the first valve element and the second valve element being connected to each other such that the on-off valve is in a fully opened state when the pressure reducing valve is in a throttling state, the on-off valve is in an opened state when the pressure reducing valve is in an opened state, and the on-off valve is in a closed state when the pressure reducing valve is in a fully opened state; and a drive unit that drives the connecting member.

According to the configuration described above, since the connecting member can be driven by the drive unit during the evacuating process, and the on-off valve can be also brought into the opened state when the pressure reducing valve is in the opened state, the intermediate-pressure refrigerant passage can be reliably drawn to vacuum through the on-off valve and the pressure reducing valve. In addition, since the connecting member can be driven by the drive unit during the filling process, and the on-off valve can be also brought into the opened state when the pressure reducing valve is in the opened state, the intermediate-pressure refrigerant passage can be reliably filled with the refrigerant through the pressure reducing valve and the on-off valve.

In order to achieve the above-described object, according to another aspect of the present disclosure, a heat pump cycle includes: a compressor that compresses a refrigerant discharged from an intake port of the compressor and discharges the refrigerant from a discharge port of the compressor, the compressor including an intermediate-pressure port through which an intermediate-pressure refrigerant flows from the cycle into the compressor and is merged with the refrigerant being in a compression process; a check valve that prevents a backward flow of the refrigerant flowing into the intermediate-pressure port; an integrated valve that reduces a pressure of the refrigerant discharged from the discharge port; a gas-liquid separation portion that separates gas and liquid of the refrigerant which has been reduced in pressure by the integrated valve; and an intermediate-pressure refrigerant passage that guides a gas-phase refrigerant separated by the gas-liquid separation portion to the intermediate-pressure port. The integrated valve includes: a body having a pressure reducing chamber in which a pressure of the refrigerant discharged from the compressor is reduced, and an on-off valve chamber in which a flow channel of the refrigerant flowing into the intermediate-pressure port through the intermediate-pressure refrigerant passage and through the check valve is opened or closed; a connecting member including a first valve element that is disposed in the pressure reducing chamber and forms a pressure reducing valve that reduces the pressure of the refrigerant discharged from the compressor, and a second valve element disposed in the on-off valve chamber and forming an on-off valve that opens or closes a flow channel of the refrigerant flowing into the intermediate-pressure port, the first valve element and the second valve element being connected to each other such that the on-off valve is in a fully opened state when the pressure reducing valve is in a throttling state, the on-off valve is in an opened state when the pressure reducing valve is in an opened state, and the on-off valve is in a closed state when the pressure reducing valve is in a fully opened state; and a drive unit that drives the connecting member.

According to the configuration described above, since the connecting member can be driven by the drive unit during the evacuating process, and the on-off valve can be also brought into the opened state when the pressure reducing valve is in the opened state, the intermediate-pressure refrigerant passage can be reliably drawn to vacuum through the on-off valve and the pressure reducing valve. In addition, since the connecting member can be driven by the drive unit during the refrigerant filling process, and the on-off valve can be also brought into the opened state when the pressure reducing valve is in the opened state, the intermediate-pressure refrigerant passage can be reliably filled with the refrigerant through the pressure reducing valve and the on-off valve.

DESCRIPTION OF EMBODIMENTS

Figure 1:
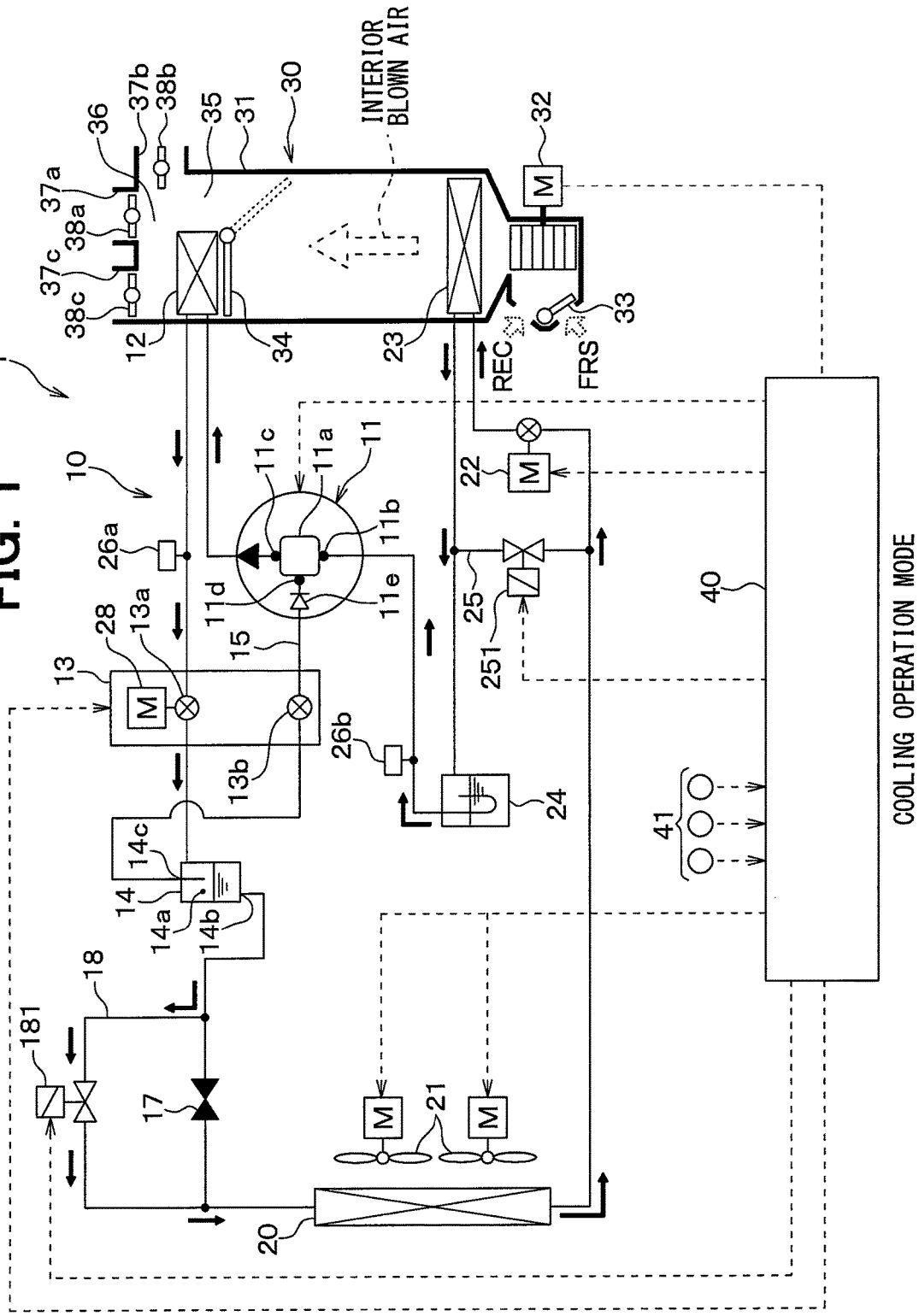
FIG. 1 is an overall configuration diagram illustrating a refrigerant circuit in a cooling operation mode of a heat pump cycle according to a first embodiment.

Hereinafter, embodiments of the present disclosure will be described referring to drawings. In the following respective embodiments, parts which are the same as or equivalent to each other may be assigned the same reference numeral in the drawings.

First Embodiment

A first embodiment will be described. In the present embodiment, a heat pump cycle 10 is applied to a vehicle air conditioning apparatus 1 of an electric vehicle that obtains a vehicle travel driving force from a traveling electric motor. The heat pump cycle 10 performs a function of cooling or heating a vehicle interior blown air to be blown into a vehicle interior which is an air-conditioning target space in the vehicle air conditioning apparatus 1 with the vehicle interior blown air used as a fluid to be heat exchanged.

Figure 2:
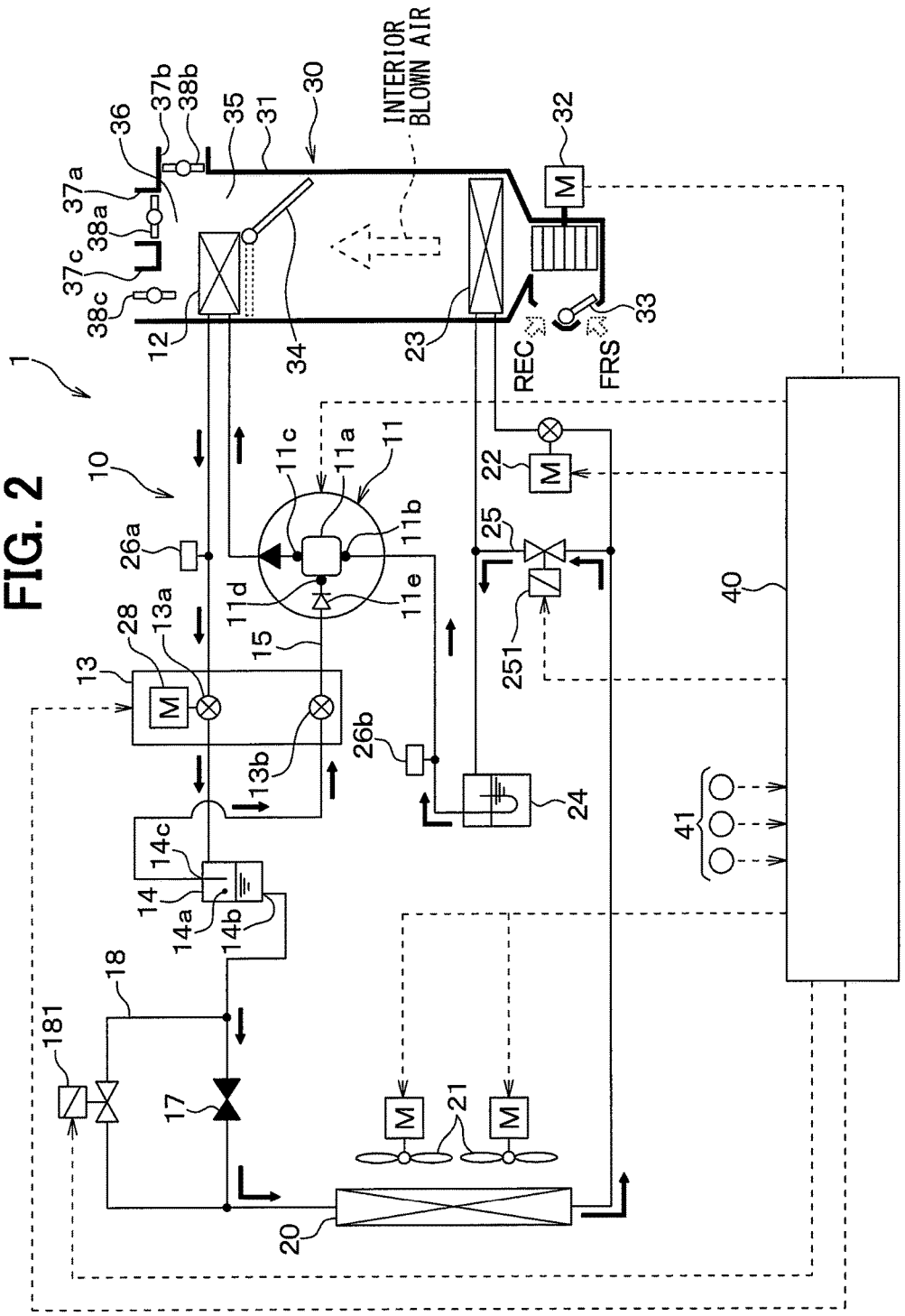
FIG. 2 is an overall configuration diagram illustrating a refrigerant circuit in a first heating mode of the heat pump cycle according to the first embodiment.
Figure 3:
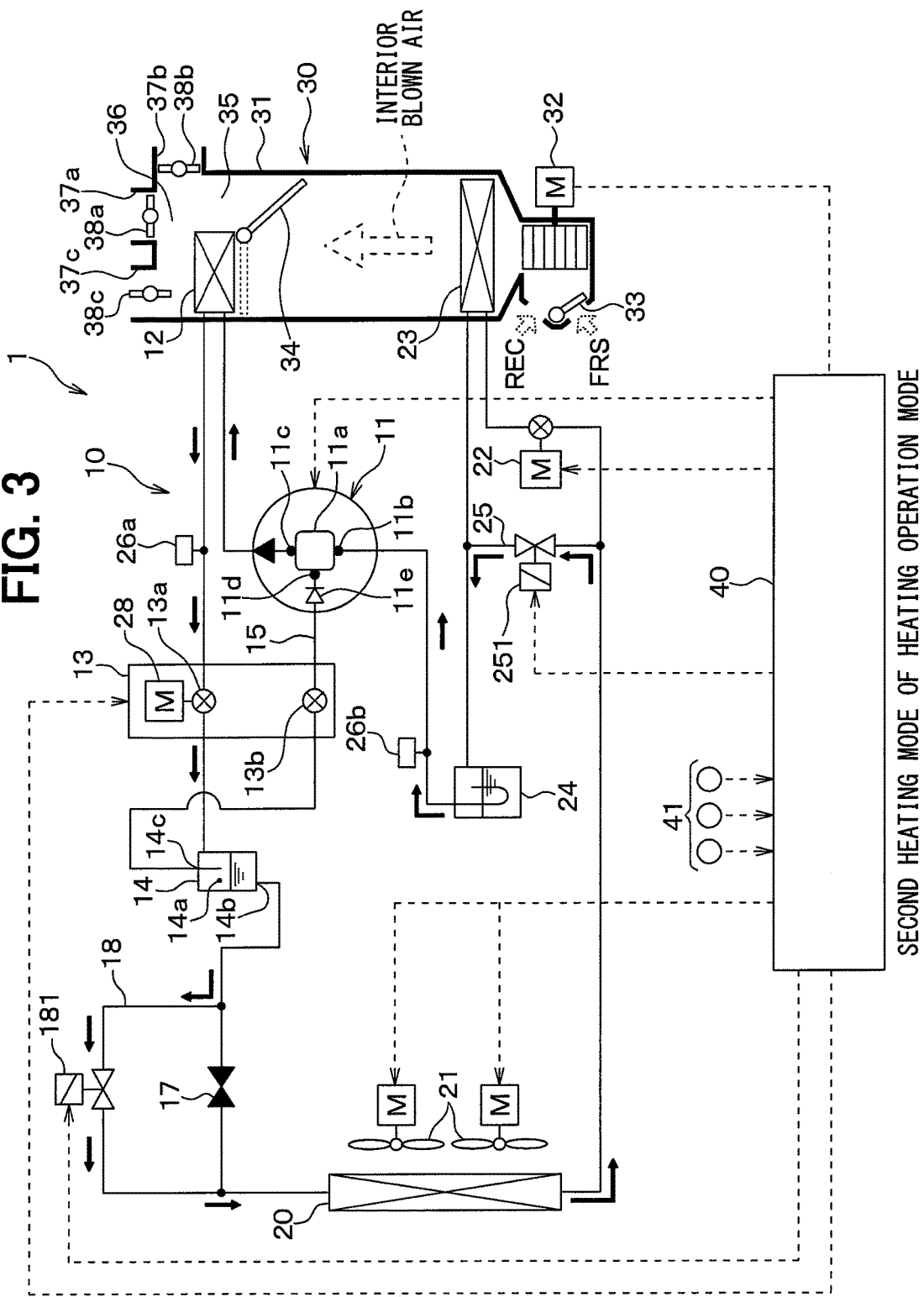
FIG. 3 is an overall configuration diagram illustrating a refrigerant circuit in a second heating mode of the heat pump cycle according to the first embodiment.

The heat pump cycle 10 according to the present embodiment is configured to be switchable between a refrigerant circuit in a cooling operation mode illustrated in FIG. 1 for cooling a vehicle interior and a refrigerant circuit in a heating operation mode illustrated in FIGS. 2 and 3 for heating the vehicle interior.

Further, as will be described later, the heat pump cycle 10 of the present embodiment is switchable, as the heating operation mode, between a refrigerant circuit of a first heating mode illustrated in FIG. 2 which is executed when an outside air temperature is extremely low (for example, at 0° C. or lower) and a refrigerant circuit of a second heating mode illustrated in FIG. 3 where normal heating is executed.

In the present embodiment, the refrigerant circuit in the first heating mode illustrated in FIG. 2 configures a gas injection cycle (that is, two-stage compression cycle), and the refrigerant circuit in the cooling operation mode and the refrigerant circuit in the second heating mode configure the normal cycle (that is, one-stage compression cycle).

Therefore, the heat pump cycle 10 according to the present embodiment is configured as a cycle that can be switched to the gas injection cycle (two-stage compression cycle) and the normal cycle (one-stage compression cycle) other than the gas injection cycle. An overall configuration diagram of FIG. 1 illustrates the refrigerant circuit when switching to the cooling operation mode, and the overall configuration diagram of FIGS. 2 and 3 illustrates the refrigerant circuit when switching to the heating operation mode. In addition, in FIGS. 1 to 3, a flow of the refrigerant in each operation mode is indicated by solid arrows.

Also, the heat pump cycle 10 employs an HFC based refrigerant (for example, R134a) as the refrigerant, and configures a subcritical refrigeration cycle of a vapor compression type in which the high-pressure side refrigerant pressure does not exceed a critical pressure of the refrigerant. It is needless to say that an HFO based refrigerant (for example, R1234yf), carbon dioxide $CO_2$ or the like may be employed as the refrigerant. Refrigerator oil for lubricating a compressor 11 is mixed with the refrigerant, and a portion of the refrigerant oil circulates in the cycle together with the refrigerant.

Among the components of the heat pump cycle 10, the compressor 11 is disposed in an engine hood of the vehicle, and draws, compresses, and discharges the refrigerant in the heat pump cycle 10. The compressor 11 is configured by an electric compressor that accommodates a compression mechanism for compressing the refrigerant in the compression chamber 11a and an electric motor for rotationally driving the compression mechanism in a housing configuring an outer shell.

The housing of the compressor 11 is provided with an intake port 11b, a discharge port 11c, and an intermediate-pressure port 11d. The intake port 11b draws a low-pressure refrigerant into the compression chamber 11a. The discharge port 11c discharges a high-pressure refrigerant from the compression chamber 11a. The intermediate-pressure port 11d guides an intermediate-pressure refrigerant in the cycle to the compression chamber 11a and merges the intermediate-pressure refrigerant with the refrigerant in a compression process.

In the compressor 11 according to the present embodiment, the compression mechanism periodically closes a communication state between the intermediate-pressure port 11d and the compression chamber 11a so that the intermediate-pressure refrigerant is appropriately injected into the compression chamber 11a.

More specifically, as a compression mechanism of the compressor 11, for example, a scroll-type compression mechanism similar to the conventional art of Patent Document 2 can be employed. In this case, the intermediate-pressure port 11d provided in an end plate portion of a fixed scroll not shown is periodically closed by tooth tips of a movable scroll not shown. The compression mechanism of the compressor 11 is not limited to the scroll-type compression mechanism as long as the compression mechanism is configured such that the communication state between the intermediate-pressure port 11d and the compression chamber 11a is temporarily blocked. A vane-type compression mechanism, a rolling piston-type compression mechanism, and the like can be employed.

In addition, the compressor 11 is internally equipped with a check valve 11e configured to allow the refrigerant to flow into the compression chamber 11a from the intermediate-pressure refrigerant passage 15 side, which will be described later, connected to the intermediate-pressure port 11d, and prohibit the refrigerant to flow from the compression chamber 11a into the intermediate-pressure refrigerant passage 15 side. As a result, when the refrigerant pressure in the compression chamber 11a becomes higher than the refrigerant pressure in the intermediate-pressure refrigerant passage 15 (that is, the refrigerant pressure on the intermediate-pressure port 11d side), the refrigerant can be prevented from flowing back from the compression chamber 11a to the intermediate-pressure refrigerant passage 15 side through the intermediate-pressure port 11d.

The operation (rotation speed) of the electric motor is controlled according to a control signal outputted from an air-conditioning control device 40, which will be described later, and may employ either an AC motor or a DC motor. With the rotation speed control, a refrigerant discharge capacity of the compressor 11 is changed. Therefore, in the present embodiment, the electric motor configures a discharge capacity changing unit of the compressor 11.

It should be noted that the compressor 11 may be configured by a compressor of the type having multiple compression mechanisms as far as the compressor has a configuration in which the intermediate-pressure refrigerant is caused to flow from the intermediate-pressure port 11d and merge with the refrigerant in the compression process and a space between the intermediate-pressure port 11d and the compression chamber 11a is temporarily closed by the compression mechanism.

A refrigerant inlet side of a vehicle interior condenser 12 is connected to the discharge port 11c of the compressor 11. The vehicle interior condenser 12 is a radiator that is disposed in an air conditioning case 31 of a vehicle interior air conditioning unit 30 which will be described later, radiates the high-pressure refrigerant discharged from the compressor 11, and heats a vehicle interior blown air that has passed through a vehicle interior evaporator 23 to be described later.

An integrated valve 13 is installed between the vehicle interior condenser 12 and a gas-liquid separator 14 to be described later. The integrated valve 13 is configured by integrating a high-pressure expansion valve 13a and an intermediate-pressure on-off valve 13b together. The high-pressure expansion valve 13a configures a pressure reducing valve, and reduces a pressure of the high-pressure refrigerant flowing out from the vehicle interior condenser 12 until the high-pressure refrigerant becomes an intermediate-pressure refrigerant. The intermediate-pressure on-off valve 13b opens and closes the intermediate-pressure refrigerant passage 15 that leads a gas-phase refrigerant separated by the gas-liquid separator 14 to the intermediate-pressure port 11d of the compressor 11. As a result, the intermediate-pressure on-off valve 13b can adjust a flow rate of the refrigerant to be merged in the intermediate-pressure port 11d. Further, the integrated valve 13 has a stepping motor capable of interlockingly controlling the high-pressure expansion valve 13a and the intermediate-pressure on-off valve 13b. The integrated valve 13 will be described later in detail.

The gas-liquid separator 14 is a centrifugal-type gas-liquid separation portion that separates the gas-liquid of the refrigerant by the aid of the action of a centrifugal force. The gas-liquid separator 14 is provided with a separation space 14a for separating the gas-liquid of the refrigerant from each other in a housing. The gas-liquid separator 14 is provided with a liquid-phase side outflow port 14b from which a liquid-phase refrigerant separated in the separation space 14a flows out and a gas-phase side outflow port 14c from which a gas-phase refrigerant separated in the separation space 14a is discharged.

An inlet side of a middle-stage side pressure reducing portion capable of reducing a pressure of the liquid-phase refrigerant flowing out from the gas-liquid separator 14 is connected to the liquid-phase side outflow port 14b of the gas-liquid separator 14. An outlet side of the middle stage pressure reducing portion is connected with a refrigerant inlet side of a vehicle exterior heat exchanger 20.

The middle-stage side pressure reducing portion is configured to be set to a throttling state for reducing the pressure of the refrigerant that has flowed from the liquid-phase side outflow port 14b of the gas-liquid separator 14. The middle-stage side pressure reducing portion according to the present embodiment includes a fixed throttle 17 for reducing the pressure of the refrigerant, a first bypass passage 18 for bypassing the fixed throttle 17 and guiding the refrigerant to the vehicle exterior heat exchanger 20 side, and a first passage on-off valve 181 for opening and closing the first bypass passage 18.

The first passage on-off valve 181 is an electromagnetic valve that opens and closes the first bypass passage 18, and the opening and closing operation of the first passage on-off valve 181 is controlled according to a control signal output from the air-conditioning control device 40. The first passage on-off valve 181 functions to switch a refrigerant flow channel of a cycle configuration by opening and closing the first bypass passage 18. Therefore, the first passage on-off valve 181 according to the present embodiment configures a refrigerant flow channel switching portion for switching the refrigerant flow channel of the refrigerant circulating in the cycle.

In this example, a pressure loss occurring when the refrigerant passes through the first passage on-off valve 181 is extremely small as compared with a pressure loss generated when passing through the fixed throttle 17. Accordingly, when the first passage on-off valve 181 is open, the refrigerant that has flowed from the vehicle interior condenser 12 flows into the vehicle exterior heat exchanger 20 through the first bypass passage 18 side, and when the first passage on-off valve 181 is closed, the refrigerant flows into the vehicle exterior heat exchanger 20 through the fixed throttle 17. As a result, the middle-stage side pressure reducing portion can be changed to a throttling state in which a pressure reducing action is exhibited and a fully opened state in which the pressure reducing action is not exerted by opening and closing of the first passage on-off valve 181.

More specifically, the middle-stage side pressure reducing portion according to the present embodiment is set to a throttling state in which the pressure reducing action is exerted when the cycle has been switched to the gas injection cycle, and set to the full opened state in which the pressure reducing action is not exerted when the cycle is switched to the normal cycle other than the gas injection cycle.

As the fixed throttle 17, a nozzle, an orifice or the like with a fixed throttle opening can be employed. In the fixed throttle such as the nozzle or the orifice, since a throttle passage area rapidly reduces or rapidly expands, the flow rate of the refrigerant passing through the fixed throttle and a dryness degree X of the refrigerant upstream of the fixed throttle can be self-adjusted and balanced with a change in a pressure difference between an upstream side and a downstream side (that is, a differential pressure between the inlet and the outlet).

More specifically, when the pressure difference is relatively large, the refrigerant is balanced so that the dryness degree of the refrigerant in the upstream side of the fixed throttle becomes larger as a required circulation refrigerant flow rate required to be circulated in the cycle is reduced more. On the other hand, when the pressure difference is relatively small, the refrigerant is balanced so that the dryness degree of the refrigerant in the upstream side of the fixed throttle becomes smaller as the required circulation refrigerant flow rate is increased more.

An intermediate-pressure refrigerant passage 15 is connected to the gas-phase side outflow port 14c of the gas-liquid separator 14 through the intermediate-pressure on-off valve 13b of the integrated valve 13. The intermediate-pressure refrigerant passage 15 is a refrigerant passage that leads the gas-phase refrigerant separated by the gas-liquid separator 14 to the intermediate-pressure port 11d of the compressor 11. The intermediate-pressure on-off valve 13b for opening and closing the intermediate-pressure refrigerant passage 15 is provided in the intermediate-pressure refrigerant passage 15. The intermediate-pressure on-off valve 13b is included in the integrated valve 13.

Figure 5:
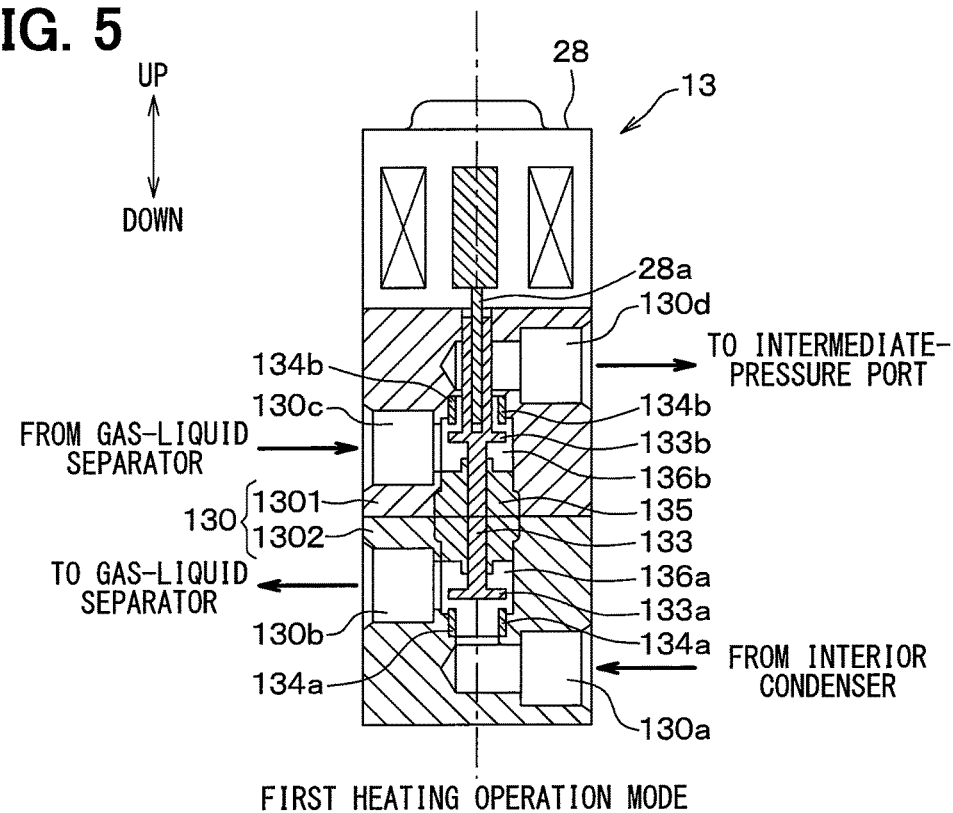
FIG. 5 is a schematic cross-sectional view of the integrated valve in a first heating mode according to the first embodiment.
Figure 6:
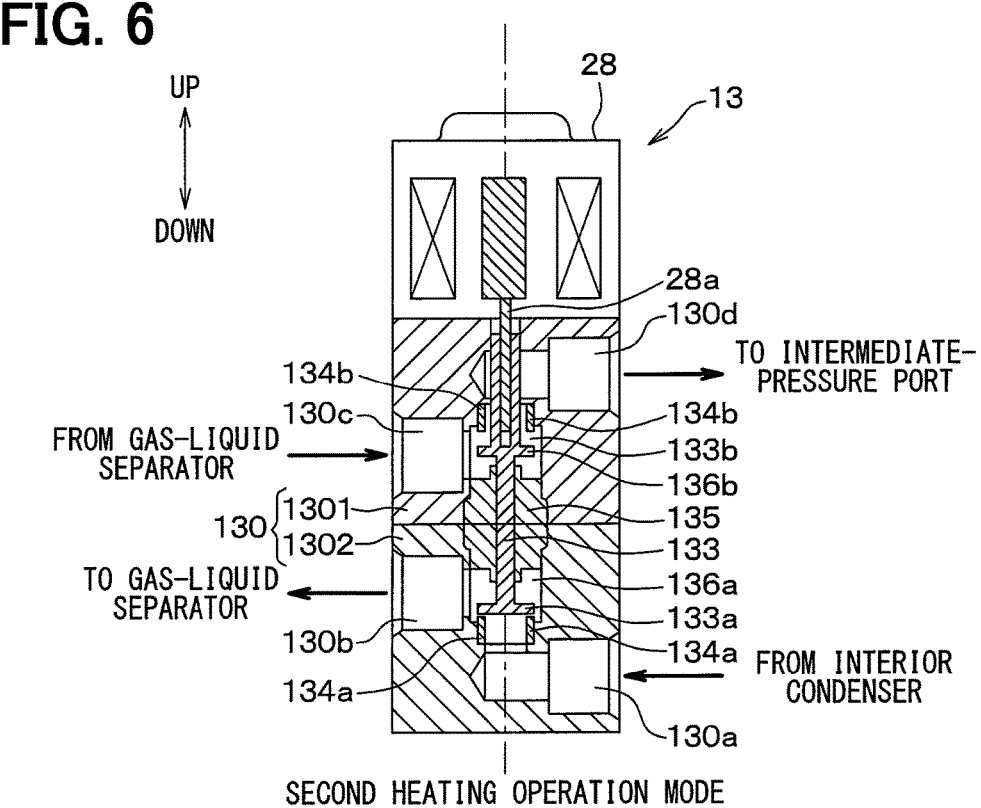
FIG. 6 is a schematic cross-sectional view of the integrated valve in a second heating mode according to the first embodiment.

Hereinafter, a configuration of the integrated valve 13 according to the present embodiment will be described with reference to FIGS. 4 to 6. The upper and lower arrows in FIGS. 4 to 6 indicate upward and downward directions in a state where the integrated valve 13 is mounted on the vehicle air conditioning apparatus 1.

Figure 4:
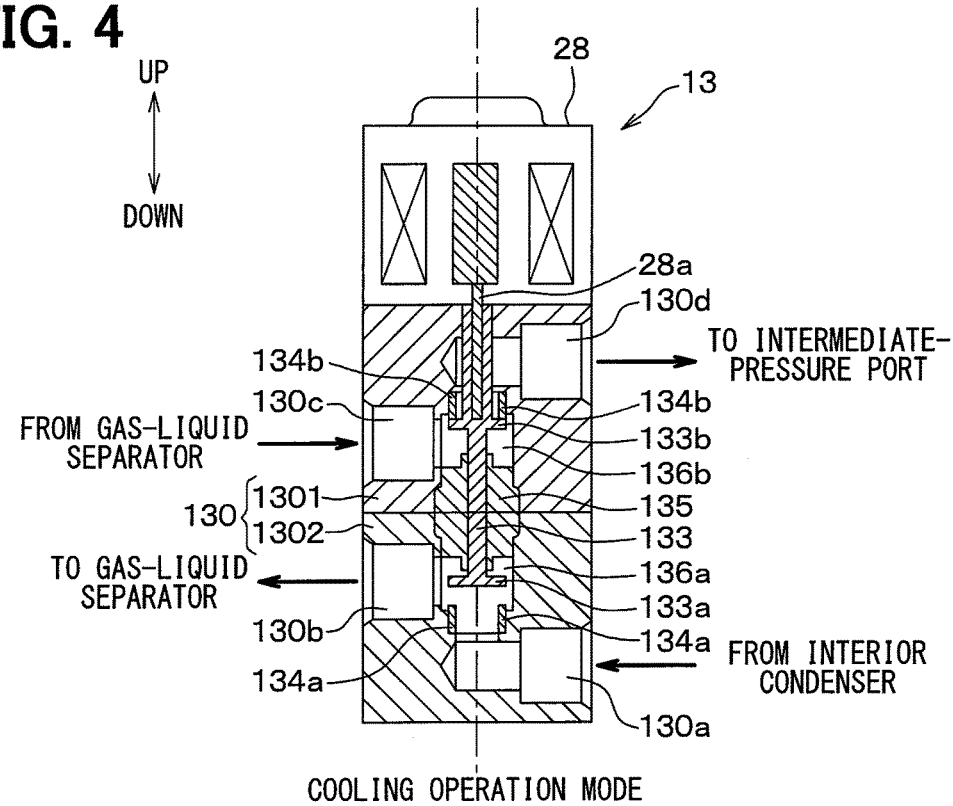
FIG. 4 is a schematic cross-sectional view of an integrated valve in a cooling operation mode according to the first embodiment.

As illustrated in FIG. 4, the integrated valve 13 includes a body 130, a stepping motor 28, a shaft 133, and the like.

The body 130 is formed as a substantially hollow metal block body. The body 130 has a structure in which an upper first member 1301 and a lower second member 1302 are assembled together. The body 130 is formed with a first refrigerant inflow port 130a into which a high-pressure refrigerant flowing out from the vehicle interior condenser 12 flows. A pressure reducing chamber 136a for reducing the pressure of the refrigerant flowing from the first refrigerant inflow port 130a is provided in the body 130. A first refrigerant outflow port 130b from which the refrigerant whose pressure has been reduced in the pressure reducing chamber 136a flows out is provided in the body 130. In addition, a second refrigerant inflow port 130c into which the gas-phase refrigerant flowing out from the gas-liquid separator 14 flows is provided in the body 130. An on-off valve chamber 136b for opening and closing a flow channel of the refrigerant flowing in from the second refrigerant inflow port 130c is provided in the body 130. The body 130 is provided with a second refrigerant outlet 130d from which the refrigerant passing through the on-off valve chamber 136b flows out.

The refrigerant that has flowed from the first refrigerant outflow port 130b flows into the gas-liquid separator 14, and the gas-phase refrigerant separated by the gas-liquid separator 14 flows into the second refrigerant inflow port 130c.

A valve seat 134a is installed on a surface of the pressure reducing chamber 136a on a side of the first refrigerant inflow port 130a. A valve seat 134b is installed on a surface of the on-off valve chamber 136b on a side of the second refrigerant outlet 130d.

A guide member 135 for supporting the shaft 133 movably in a vertical direction is provided between the pressure reducing chamber 136a and the on-off valve chamber 136b. The guide member 135 is made of a metal member (for example, aluminum).

The stepping motor 28 is a drive unit for driving the shaft 133. In the stepping motor 28, a rotation shaft 28a rotates by a predetermined angle according to a pulse signal input from the air-conditioning control device 40.

The shaft 133 is made of a metal member (for example, stainless steel), and has a cylindrical shape having a hollow portion. Threaded grooves are each provided in an inner peripheral surface of the shaft 133 and an outer peripheral surface of the rotation shaft 28a of the stepping motor 28. The rotation shaft 28a of the stepping motor 28 is inserted in the hollow portion of the shaft 133. When the rotation shaft 28a of the stepping motor 28 rotates, the shaft 133 is screwed or unscrewed in the vertical direction (that is, an axial direction of the shaft 133). The screwing means rotating advance. The unscrewing means rotating retraction.

The outer peripheral surface of the shaft 133 is provided with a first valve element 133a and a second valve element 133b. The first valve element 133a is disposed in the pressure reducing chamber 136a, and the second valve element 133b is disposed in the on-off valve chamber 136b. The shaft 133 is a connecting member that couples the first valve element 133a disposed in the pressure reducing chamber 136a and the second valve element 133b disposed in the on-off valve chamber 136b. The first valve element 133a and the valve seat 134a configure the high-pressure expansion valve 13a illustrated in FIGS. 1 to 3, and the second valve element 133b and the valve seat 134b configure the intermediate-pressure on-off valve 13b illustrated in FIGS. 1 to 3.

The first valve element 133a moves away from and comes in contact with the valve seat 134a disposed in the pressure reducing chamber 136a according to a vertical movement of the shaft 133. As illustrated in FIGS. 4 and 5, in a state in which the first valve element 133a and the valve seat 134a are separated from each other, the high-pressure expansion valve 13a is in a valve opening state, and the high-pressure expansion valve 13a does not exhibit the pressure reducing action. As illustrated in FIG. 6, in a state in which a distance between the first valve element 133a and the valve seat 134a is short and the valve opening degree of the high-pressure expansion valve 13a is a minute opening degree, the high-pressure expansion valve 13a exerts the pressure reducing action to reduce the pressure of the refrigerant that has flowed from the vehicle interior condenser 12 until the refrigerant reaches at least the intermediate-pressure refrigerant.

The second valve element 133b moves away from and comes in contact with the valve seat 134b disposed in the on-off valve chamber 136b according to the vertical movement of the shaft 133, and opens and closes the flow channel between the on-off valve chamber 136b and the second refrigerant outlet 130d. As illustrated in FIG. 4, in a state where the second valve element 133b and the valve seat 134b come in contact with each other, the intermediate-pressure on-off valve 13b is in a closed state and the intermediate-pressure refrigerant passage 15 is in a closed state. As illustrated in FIGS. 5 and 6, in a state where the second valve element 133b and the valve seat 134b move away from each other, the intermediate-pressure on-off valve 13b is in a fully opened state and the intermediate-pressure refrigerant passage 15 is in an opened state.

In this example, since the gas-phase refrigerant separated by the gas-liquid separator 14 is lighter than the liquid-phase refrigerant, the second refrigerant inflow port 130c is disposed above the first refrigerant inflow port 130a. For that reason, the intermediate-pressure on-off valve 13b is disposed above the high-pressure expansion valve 13a.

In this case, for example, it is assumed that a flow channel on the side of the first refrigerant inflow port 130a rather than the valve seat 134a and the on-off valve chamber 136b are disposed adjacent to each other through the guide member 135. In this case, since a large pressure difference occurs between the two adjacent flow channel portions, the high-pressure refrigerant leaks toward the on-off valve chamber 136b side through a gap between the guide member 135 and the shaft 133. The valve seat 134a configures the high-pressure expansion valve 13a. In addition, the first refrigerant inflow port 130a allows the high-pressure refrigerant flowing out from the vehicle interior condenser 12 to flow in.

Under the circumstances, in the integrated valve 13 according to the present embodiment, the flow channel portion on the side of the first refrigerant outflow port 130b rather than the valve seat 134a configuring the high-pressure expansion valve 13a and the on-off valve chamber 136b are disposed adjacent to each other through the guide member 135 that guides the shaft 133.

In the present embodiment, a centrifugal separation type gas-liquid separator 14 is employed. The gas-liquid separator 14 of such a centrifugal separation type has a very small pressure loss. For that reason, as in the present embodiment, the flow channel portion on the side of the first refrigerant outflow port 130b rather than the valve seat 134a configuring the high-pressure expansion valve 13a and the on-off valve chamber 136b are disposed adjacent to each other through the guide member 135, thereby being capable of reducing a pressure difference between the two adjacent flow channel portions. As a result, a sealing structure between the guide member 135 and the shaft 133 can be made unnecessary.

Figure 7:
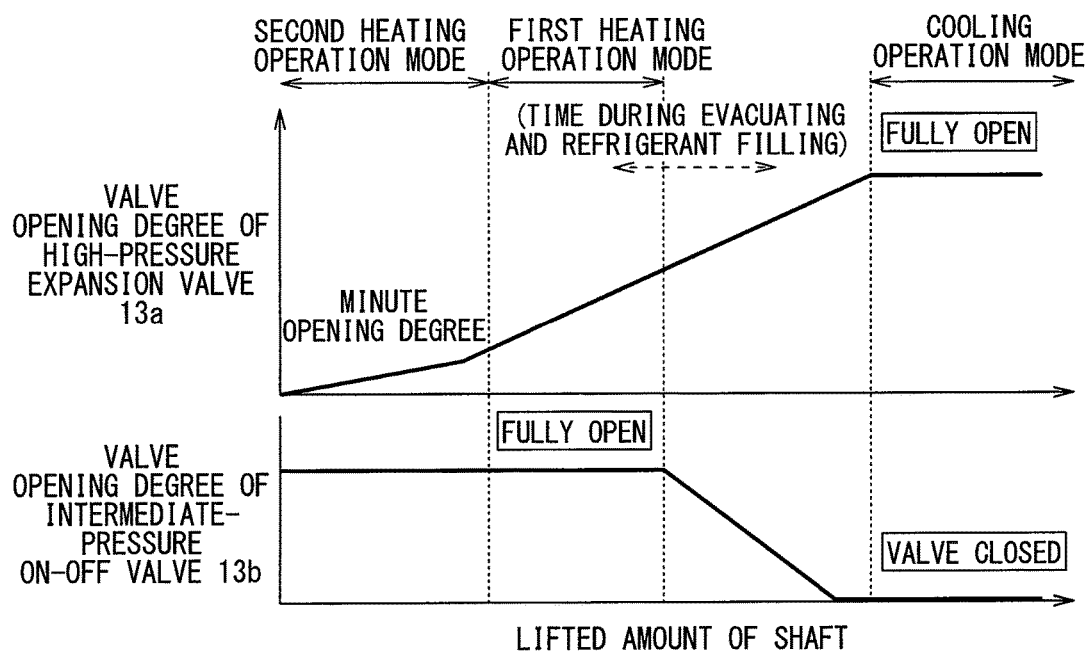
FIG. 7 is a diagram illustrating a relationship between valve opening degrees of a high-pressure expansion valve and an intermediate-pressure on-off valve of the integrated valve and a lift amount in an axial direction of a shaft.

FIG. 7 illustrates a relationship between valve opening degrees of the high-pressure expansion valve 13a and the intermediate-pressure on-off valve 13b and a lift amount in the axial direction of the shaft 133. As the lift amount of the shaft 133 in the axial direction is larger, the shaft 133 moves upward more.

In the cooling operation mode, the valve opening degree of the high-pressure expansion valve 13a is fully opened and the valve opening degree of the intermediate-pressure on-off valve 13b is fully closed. In other words, the refrigerant flows as indicated by solid arrows in FIG. 1. In the cooling operation mode, the low-pressure expansion valve 22 is brought in a throttling state to reduce the pressure of the refrigerant.

Further, in the first heating operation mode, the valve opening degree of the high-pressure expansion valve 13a is a predetermined intermediate opening degree and the valve opening degree of the intermediate-pressure on-off valve 13b is fully opened. In other words, the refrigerant flows along the solid arrows in FIG. 2. In the first heating operation mode, in order to reduce the pressure of the refrigerant by the high-pressure expansion valve 13a and the fixed throttle 17, the high-pressure expansion valve 13a realizes a throttle opening for reducing the pressure of the high-pressure refrigerant flowing out from the vehicle interior condenser 12 until the high-pressure refrigerant reaches the intermediate-pressure refrigerant.

Further, in the second heating operation mode, the valve opening degree of the high-pressure expansion valve 13a is minute and the opening degree of the intermediate-pressure on-off valve 13b is fully opened. In other words, the refrigerant flows as indicated by solid arrows in FIG. 3. In the second heating operation mode, since the pressure of the refrigerant is reduced by only the high-pressure expansion valve 13a, the throttle opening of the high-pressure expansion valve 13a becomes smaller than that in the first heating operation mode.

In the first and second heating operation modes, the valve opening degree of the intermediate-pressure on-off valve 13b is fully opened. However, since the compressor 11 according to the present embodiment includes the check valve 11e, the refrigerant merged in the intermediate-pressure port can be prevented from flowing back to the gas-liquid separator 14 side.

As will be described in detail later, when carrying out evacuating and refrigerant filling operation, the high-pressure expansion valve 13a and the intermediate-pressure on-off valve 13b are simultaneously opened to implement the operation.

Returning to FIGS. 1 to 3, the vehicle exterior heat exchanger 20 is disposed within an engine hood, and performs a heat exchange between the refrigerant flowing in the vehicle exterior heat exchanger 20 and a vehicle exterior air (that is, outside air) blown from a blower fan 21. The vehicle exterior heat exchanger 20 is a heat exchanger that functions as an evaporator configured to exercise a heat absorbing effect by evaporating the refrigerant in the first and second heating modes and so on, and functions as a radiator configured to radiate a heat from the refrigerant in the cooling operation mode and so on.

The refrigerant inlet side of the low-pressure expansion valve 22 is connected to a refrigerant outlet side of the vehicle exterior heat exchanger 20. The low-pressure expansion valve 22 reduces the refrigerant that flows out from the vehicle exterior heat exchanger 20 and flows into the vehicle interior evaporator 23 in the cooling operation mode or the like. A basic configuration of the low-pressure expansion valve 22 is the same as that of the high-pressure expansion valve 13a, and the operation of the low-pressure expansion valve 22 is controlled according to a control signal output from the air-conditioning control device 40.

A refrigerant inlet side of the vehicle interior evaporator 23 is connected to an outlet side of the low-pressure expansion valve 22. The vehicle interior evaporator 23 is a heat exchanger that is disposed on an air flow upstream side of the vehicle interior condenser 12 in the blown air flow in the air conditioning case 31 of the vehicle interior air conditioning unit 30. In the cooling operation mode, the vehicle interior evaporator 23 evaporates the refrigerant and exerts the heat absorbing effect, thereby cooling the air blown into the vehicle interior.

An inlet side of an accumulator 24 is connected to a refrigerant outlet side of the vehicle interior evaporator 23. The accumulator 24 separates the refrigerant flowed into the inside of the accumulator 24 into gas and liquid and accumulates an excessive refrigerant. Further, the gas-phase refrigerant outlet side of the accumulator 24 is connected with the intake port 11b of the compressor 11. Accordingly, the vehicle interior evaporator 23 is connected so as to allow the refrigerant to flow out to the intake port 11b side of the compressor 11.

A refrigerant outlet side of the vehicle exterior heat exchanger 20 is connected with a second bypass passage 25 for leading the refrigerant that has flowed from the vehicle exterior heat exchanger 20 to an inlet side of the accumulator 24 while bypassing the low-pressure expansion valve 22 and the vehicle interior evaporator 23.

A second passage on-off valve 251 for opening and closing the second bypass passage 25 is disposed in the second bypass passage 25. The basic configuration of the second passage on-off valve 251 is an electromagnetic valve which is the same as that of the first passage on-off valve 181, and the opening and closing operation of the second passage on-off valve is controlled according to a control signal output from the air-conditioning control device 40.

The second passage on-off valve 251 according to the present embodiment functions to switch a cycle configuration (refrigerant flow channel) by opening and closing the second bypass passage 25. Therefore, the second passage on-off valve 251 according to the present embodiment configures a refrigerant flow channel switching portion for switching the refrigerant flow channel of the refrigerant circulating in the cycle. Incidentally, a pressure loss occurring when the refrigerant passes through the second passage on-off valve 251 is extremely small as compared with a pressure loss generated when passing through the low-pressure expansion valve 22. Accordingly, when the second passage on-off valve 251 is open, the refrigerant that has flowed from the vehicle exterior heat exchanger 20 flows into the accumulator 24 through the second bypass passage 25, and when the second passage on-off valve 251 is closed, the refrigerant flows into the vehicle interior evaporator 23 through the low-pressure expansion valve 22.

Meanwhile, the heat pump cycle 10 requires a refrigerant filling operation for filling the refrigerant into the cycle at the time of manufacturing a product or exchanging a cycle configuration equipment. In the refrigerant filling operation, an evacuating process for removing air and moisture in the cycle is carried out, and a filling process for filling a specified amount of refrigerant into the cycle after completion of the evacuating process is implemented.

In order to perform such a refrigerant filling operation, the heat pump cycle 10 is provided with a first filling port 26a for filling the refrigerant from a high-pressure side in the cycle, and a second filling port 26b for filling the refrigerant from the low-pressure side in the cycle.

In the present embodiment, the first filling port 26a is provided in a refrigerant passage extending from the vehicle interior condenser 12 to the high-pressure expansion valve 13a, and the second filling port 26b is provided in a refrigerant passage extending from the accumulator 24 to the intake port 11b of the compressor 11. In the present embodiment, the first filling port 26a also functions as a port for implementing evacuation.

In this case, in the heat pump cycle that combines the technique of Patent Document 1 with the technique of Patent Document 2, as will be described in a remarks column to be described later, the following two problems may occur.

(1) There is a case in which the intermediate-pressure refrigerant passage 111 cannot be drawn to vacuum during the refrigerant filling operation.

(2) There is a case in which the intermediate-pressure refrigerant passage 111 cannot be filled with the refrigerant during the refrigerant filling operation.

In view of the above, the integrated valve 13 according to the present embodiment is configured to integrate the high-pressure expansion valve 13a and the intermediate-pressure on-off valve 13b together, and control the high-pressure expansion valve 13a and the intermediate-pressure on-off valve 13b in conjunction with each other by the aid of the stepping motor 28 functioning as an actuator operating according to a control signal output from the air-conditioning control device 40.

The integrated valve 13 is provided with the body 130. The pressure reducing chamber 136a for reducing the pressure of the refrigerant discharged from the compressor 11 is provided in the body 130. The on-off valve chamber 136b for opening and closing a flow channel of the refrigerant to be merged with the intermediate-pressure port 11d through the intermediate-pressure refrigerant passage 15 and the check valve 11e is provided in the body 130.

Further, the integrated valve 13 is provided with the shaft 133. The shaft 133 has the first valve element 133a and the second valve element 133b. The first valve element 133a configures the high-pressure expansion valve 13a that is disposed in the pressure reducing chamber 136a for reducing the pressure of the refrigerant discharged from the compressor 11. The second valve element 133b configures the on-off valve 13b that is disposed in the on-off valve chamber 136b for opening and closing a flow channel of the refrigerant to be merged with the intermediate-pressure port 11d.

In addition, the integrated valve 13 is equipped with the stepping motor 28 that drives the shaft 133. The shaft 133 connects the first valve element 133a and the second valve element 133b to fully open the on-off valve 13b when the high-pressure expansion valve 13a is in the throttling state, to open the on-off valve 13b when the high-pressure expansion valve 13a is in the opened state, and to close the on-off valve 13b when the high-pressure expansion valve 13a is in the fully opened state.

In this example, in the evacuating process of the refrigerant filling operation, the shaft 133 is driven by the stepping motor 28, and when the high-pressure expansion valve 13a is in the opened state, the on-off valve 13b can also be put in the opened state. Therefore, the intermediate-pressure refrigerant passage 15 can be reliably drawn to vacuum through the on-off valve 13b and the high-pressure expansion valve 13a.

Further, during the filling process, the shaft 133 is driven by the stepping motor 28, and when the high-pressure expansion valve 13a is in the opened state, the on-off valve 13b can also be in the opened state. Therefore, the intermediate-pressure refrigerant passage can be reliably filled with the refrigerant through the high-pressure expansion valve 13a and the on-off valve 13b.

Next, the vehicle interior air conditioning unit 30 will be described. The vehicle interior air conditioning unit 30 is disposed inside of an instrument panel at a foremost portion of the vehicle interior (that is, the instrument panel) to form an outer shell of the vehicle interior air conditioning unit 30, and internally includes the air conditioning case 31 that defines an air passage of the vehicle interior blown air to be blown into the vehicle interior. The blower 32, the aforementioned vehicle interior condenser 12, the vehicle interior evaporator 23, and the like are accommodated in the air passage.

An inside and outside air switching device 33 configured to switch the vehicle interior air (inside air) and outside air is disposed on a most upstream side of the air conditioning case 31 along the air flow. The inside and outside air switching device 33 continuously adjusts opening areas of an inside air introduction port for introducing the inside air into the air conditioning case 31, and an outside air introduction port for introducing the outside air into the air conditioning case by an inside and outside air switching door to continuously change an air volume ratio of an inside air volume and an outside air volume.

The blower 32 that blows the air drawn through the inside and outside air switching device 33 toward the vehicle interior is disposed on an air flow downstream side of the inside and outside air switching device 33 along the air flow. The blower 32 is an electric blower that drives a centrifugal multi-blade fan (that is, sirocco fan) with an electric motor, and the rotation speed and the blowing rate of the blower 32 are controlled according to a control signal that is output from the air-conditioning control device 40.

The vehicle interior evaporator 23 and the vehicle interior condenser 12 described above are disposed on the air flow downstream side of the blower 32 along the air flow in the stated order of the vehicle interior evaporator 23 and the vehicle interior condenser 12 along the flow of the vehicle interior blown air. In other words, the vehicle interior evaporator 23 is disposed on the air flow upstream side of the vehicle interior condenser 12 along the air flow.

A bypass passage 35 that bypasses the vehicle interior condenser 12 and blows the blown air that has passed through the vehicle interior evaporator 23 is provided in the air conditioning case 31. An air mixing door 34 is disposed on the air flow downstream side of the vehicle interior evaporator 23 and on the air flow upstream side of the vehicle interior condenser 12.

The air mixing door 34 is a heat exchange capacity adjustment unit that adjusts the air volume ratio between the amount of air passing through the vehicle interior condenser 12 and the amount of air passing through the bypass passage 35 in the blown air that has passed through the vehicle interior evaporator 23 to adjust a heat exchange capability of the vehicle interior condenser 12. The air mixing door 34 is driven by a servomotor not shown whose operation is controlled according to a control signal output from the air-conditioning control device 40.

A merging space 36 in which the blown air heated by heat exchange with the refrigerant in the vehicle interior condenser 12 and the blown air not heated by passing through the bypass passage 35 are merged with each other is provided on the air flow downstream side of the vehicle interior condenser 12 and the bypass passage 35.

Opening holes for blowing out the blown air merged in the merging space 36 into the vehicle interior as an air-conditioning target space are provided in a most downstream portion of the air conditioning case 31 along the air flow. More specifically, a defroster opening hole 37a for blowing air conditioning wind toward an inner side surface of a vehicle front window glass, a face opening hole 37b for blowing the conditioned air toward an upper body of an occupant in the vehicle interior, and a foot opening hole 37c for blowing the conditioned air toward a foot of the occupant are provided.

Air flow downstream sides of the respective opening holes 37a to 37c are connected to face blowing ports, foot blowing ports, and defroster blowing ports disposed in the vehicle interior through ducts that forming air passages, respectively.

A defroster door 38a that opens and closes the defroster opening hole 37a, a face door 38b that opens and closes the face opening hole 37b, and a foot door 38c that opens and closes the foot opening hole 37c are disposed on the air flow upstream side of the opening holes 37a to 37c, respectively. The respective doors 38a to 38c configure a blowout mode switching unit for switching a blowing mode of the air into the vehicle interior. The respective air mixing doors 38a to 38c are driven by a servomotor not shown whose operation is controlled according to a control signal output from the air-conditioning control device 40.

Next, an electric control unit of the present embodiment will be described. The air-conditioning control device 40 includes a well-known microcomputer that includes a CPU, a ROM, a RAM, and the like, and a peripheral circuit of the microcomputer. Both of the ROM and the RAM are non-transitional physical storage media. The air-conditioning control device 40 performs various calculations and processes based on control programs stored in the ROM or the like, and controls the operation of each control equipment (for example, the compressor 11, the integrated valve 13, each passage on-off valves 181, 251, the blower 32, etc.) connected to an output side of the air-conditioning control device 40.

An air conditioning control sensor group 41 is connected to an input side of the air-conditioning control device 40. The sensor group 41 includes an inside air sensor for detecting a vehicle interior temperature, an outside air sensor for detecting the outside air temperature, an insolation sensor for detecting the amount of insolation in the vehicle interior, an evaporator temperature sensor for detecting the temperature of the vehicle interior evaporator 23, a discharge pressure sensor for detecting the pressure of the high-pressure refrigerant discharged from the compressor 11, and the like.

Furthermore, an operation panel not shown, which is disposed in the vicinity of an instrument panel is connected to the input side of the air-conditioning control device 40, so that operation signals output from various air conditioning operation switches mounted on the operation panel are input to the air-conditioning control device 40. Specifically, an operation switch of the vehicle air conditioning apparatus 1, a vehicle interior temperature setting switch configured to set the vehicle interior temperature, a select switch between a cooling operation mode and a heating operation mode and the like are provided as the various air conditioning operation switches that are mounted on the operation panel.

The air-conditioning control device 40 is integrated with a control unit that controls the operations of the various control instruments connected to the output side of the air conditioning control device 40, but a configuration (that is, hardware and software) for controlling the operation of the respective controlled instruments configures a control unit that controls the operation of the respective controlled instruments.

For example, in the present embodiment, a configuration (that is, hardware and software) that controls the opening and closing operations of the respective passage on-off valves 181 and 251 configures a flow channel switching control unit. The flow channel switching control unit in the air-conditioning control device 40 may be configured by another control device different from the air-conditioning control device 40.

Next, the refrigerant filling operation for the heat pump cycle 10 of the present embodiment configured as described above and the operation of the vehicle air conditioning apparatus 1 will be described. First, the refrigerant filling operation for the heat pump cycle 10 according to the present embodiment will be described.

Figure 8:
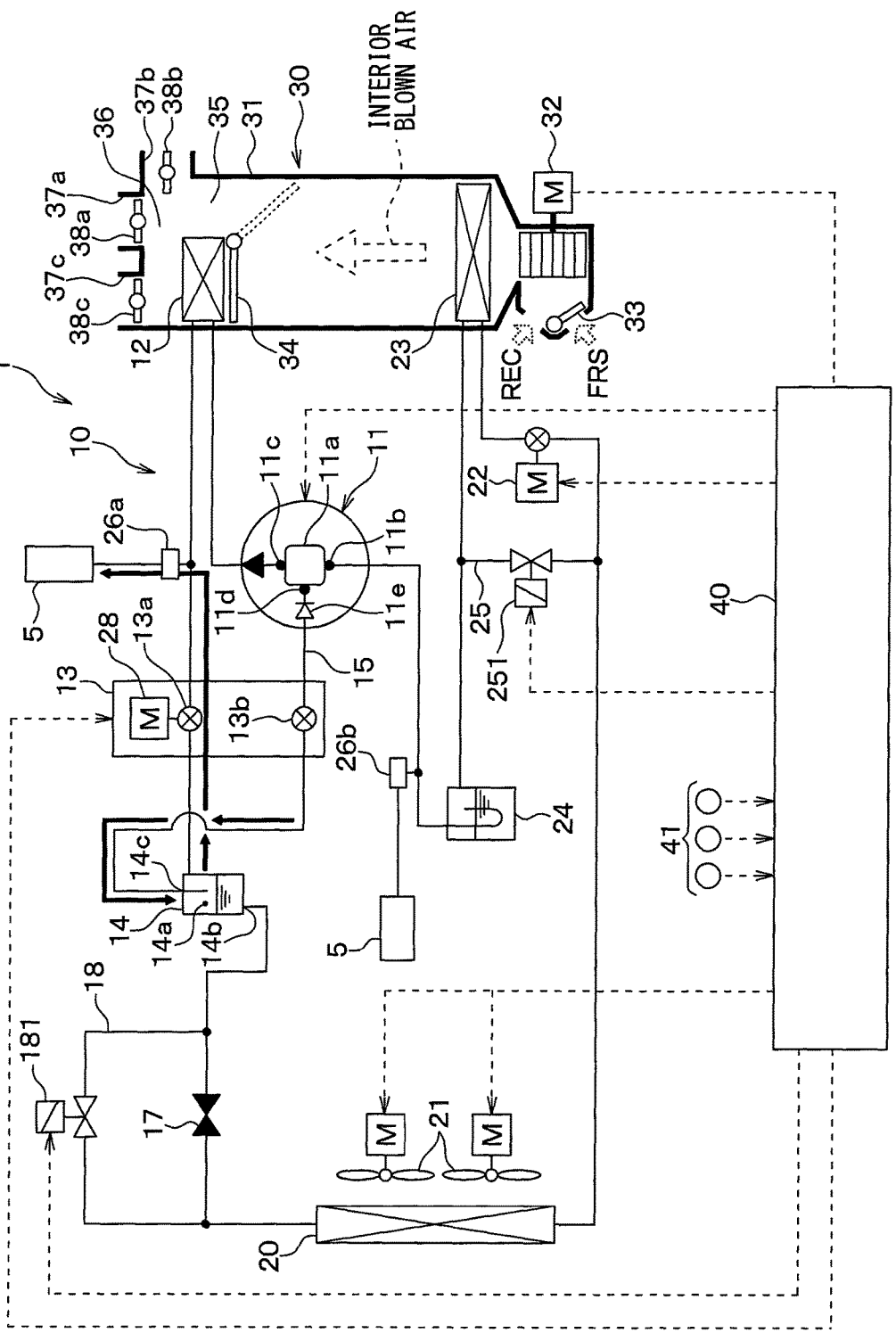
FIG. 8 is an overall configuration diagram for illustrating an evacuating process during a refrigerant filling operation of the heat pump cycle according to the first embodiment.
Figure 9:
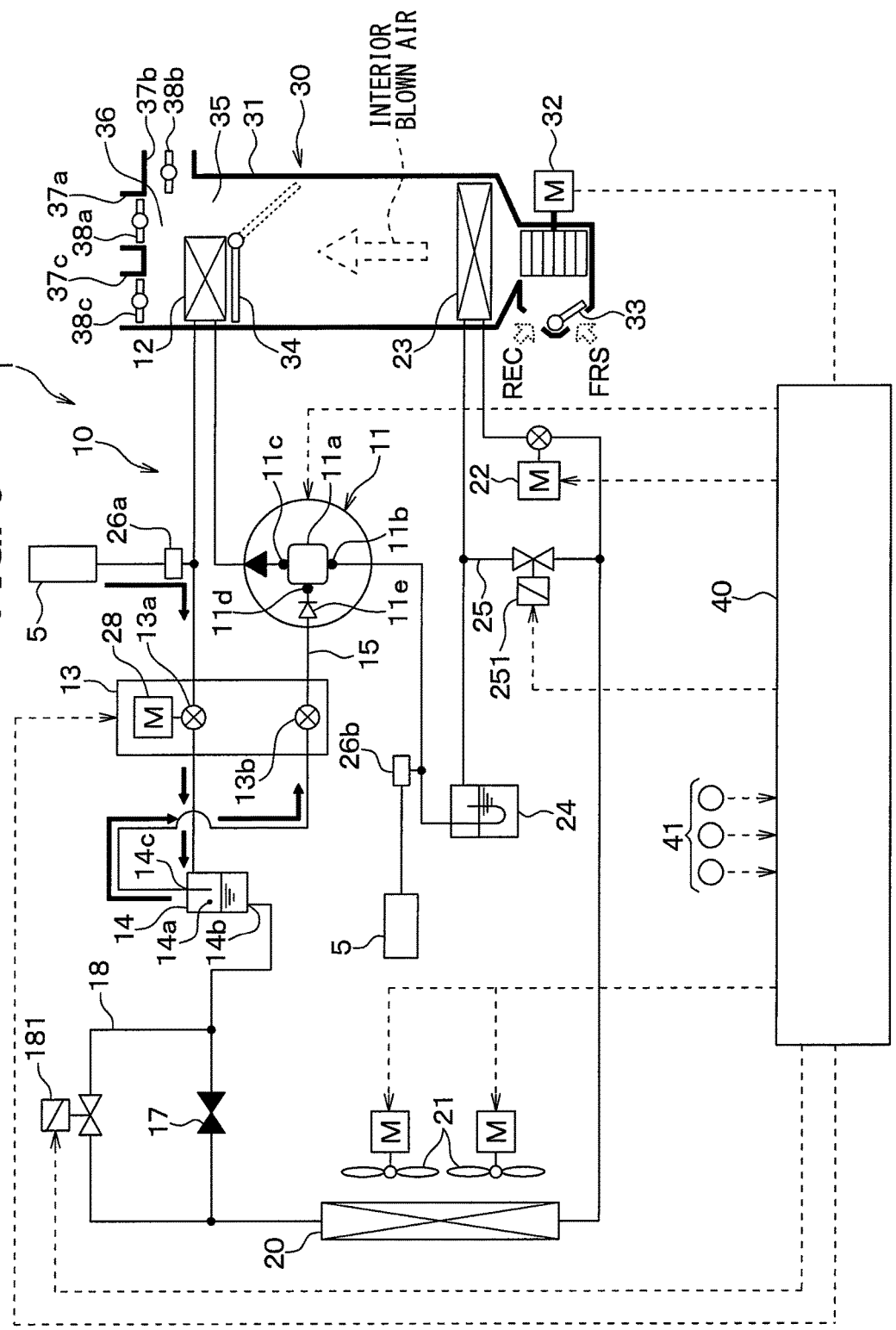
FIG. 9 is an overall configuration diagram for illustrating the evacuating process during the refrigerant filling operation of the heat pump cycle according to the first embodiment.

In the refrigerant filling operation, as illustrated in FIGS. 8 and 9, a refrigerant filling device 5 having a vacuum pump and a refrigerant filling pump is connected to the first and second filling ports 26a and 26b. In a state where the high-pressure expansion valve 13a, the intermediate-pressure on-off valve 13b, and the respective passage on-off valves 181 and 251 are opened, the air or the like remaining in the cycle is drawn from the first filling port 26a by the refrigerant filling device 5. This is an evacuating process. In the evacuating process, for example, air or the like remaining in the cycle may be drawn from the second filling port 26b by the refrigerant filling device 5.

In this case, in the heat pump cycle described as a study example in the remarks column, if the intermediate-pressure port 101c is closed inside of the compressor 101 during the evacuating process, the intermediate-pressure refrigerant passage 111 cannot be appropriately drawn to vacuum from the discharge port 101b side of the compressor 101.

In addition, in the heat pump cycle described as the study example in the remarks column, since the respective on-off valves 105b and 110a are opened during the evacuating process, no differential pressure across the fixed throttle 105a almost occurs. For that reason, the differential pressure on-off valve 112 does not open during the evacuating process, and the intermediate-pressure refrigerant passage 111 cannot be also drawn to vacuum from the gas-phase side outflow port side of the gas-liquid separator 104.

On the other hand, in the heat pump cycle 10 according to the present embodiment, the high-pressure expansion valve 13a and the intermediate-pressure on-off valve 13b can be brought into the opened state at the same time by driving the shaft 133 by the aid of the stepping motor 28. Therefore, the air or moisture remaining in the intermediate-pressure refrigerant passage 15 can be drawn from the gas-phase side outflow port 14c side of the gas-liquid separator 14 by the refrigerant filling device 5, as indicated by solid line arrows in FIG. 8. Therefore, even if the intermediate-pressure port 11d is closed inside of the compressor 11 during the evacuating process, the intermediate-pressure refrigerant passage 15 can be reliably drawn to vacuum.

After completion of the evacuating process, the cycle is filled with the refrigerant from the first filling port 26a and the second filling port 26b by the refrigerant filling device 5. This is a filling process. In the filling process, the cycle may be filled with the refrigerant from one port of the first filling port 26a and the second filling port 26b by the refrigerant filling device 5.

In the heat pump cycle described as the study example in the remarks column, the intermediate-pressure refrigerant passage 111 is brought in a vacuum state (that is, P1≈0) in the evacuating process. As a result, during the filling process, a differential pressure between a pressure P2 on the gas-phase side outflow port side of the gas-liquid separator 104 and a pressure P1 on the intermediate-pressure refrigerant passage 111 side is increased with the result that the differential pressure on-off valve 112 may be closed. For example, when a second term and a third term of a right side of [Ex. 1] in the remarks column are changed from "−A1× (P2−P1)−Fsp" to "−A1×P2−Fsp", F of [Ex. 1] becomes unlikely to be a positive value. As a result, the differential pressure on-off valve 112 is maintained in the closed state.

For that reason, in the heat pump cycle described as the study example in the remarks column, when the cycle is filled with the refrigerant, the differential pressure on-off valve 112 is closed, and the intermediate-pressure refrigerant passage 111 may not be filled with the refrigerant from the gas-phase side outflow port side of the gas-liquid separator 104.

On the other hand, in the heat pump cycle 10 according to the present embodiment, the shaft 133 is driven by the stepping motor 28, thereby being capable of simultaneously opening the high-pressure expansion valve 13a and the intermediate-pressure on-off valve 13b. Therefore, as indicated by solid line arrows in FIG. 9, the intermediate-pressure refrigerant passage 15 can be reliably filled with the refrigerant from the refrigerant filling device 5 through the high-pressure expansion valve 13a of the integrated valve 13, the gas-liquid separator 14, and the intermediate-pressure on-off valve 13b of the integrated valve 13.

Next, the operation of the vehicle air conditioning device 1 according to the present embodiment will be described. The vehicle air conditioning apparatus 1 can switch between the cooling operation mode and the heating operation mode. The operations of the respective operation modes will be described.

(A) Cooling Operation Mode

For example, the cooling operation mode starts when the cooling operation mode is selected by the select switch in a state in which the operation switch of the operation panel turns on.

In the cooling operation mode, the air-conditioning control device 40 puts the high-pressure expansion valve 13a in the fully opened state (that is, a state where the pressure reduction action is not exerted), the intermediate-pressure on-off valve 13b in the closed state, the low-pressure expansion valve 22 in the throttling state (that is, a state in which the pressure reducing action is exerted), and the second passage on-off valve 251 in the closed state.

Further, the air-conditioning control device 40 puts the first passage on-off valve 181 in the opened state and the middle-stage side pressure reducing portion in the fully opened state (a state in which the pressure reducing action is not exerted). As a result, the heat pump cycle 10 is switched to a refrigerant circuit in which the refrigerant flows as indicated by solid line arrows in FIG. 1.

In the refrigerant circuit configuration, the air-conditioning control device 40 reads a detection signal of the air conditioning control sensor set 41 and an operation signal of the operation panel, and calculates a target blowing temperature TAO which is a target temperature of the air blown into the vehicle interior. Further, the air-conditioning control device 40 determines operation states of the various control devices connected to the output side of the air-conditioning control device 40 on the basis of the calculated target blowing temperature TAO and the detection signals of the sensor group.

For example, a control signal to be output to the electric motor of the compressor 11 is determined in the following manner. First, a target evaporator blowing temperature TEO of the vehicle interior evaporator 23 is determined on the basis of the target blowing temperature TAO with reference to a control map that is stored in the air-conditioning control device 40 in advance. A control signal to be output to the electric motor of the compressor 11 is determined so that the detection value of the evaporator temperature sensor (that is, the blowing air temperature) approaches the target evaporator blowing temperature TEO.

Furthermore, a control signal to be output to the low-pressure expansion valve 22 is determined so that the degree of subcooling of the refrigerant flowing into the low-pressure expansion valve 22 approaches a predetermined target degree of subcooling, which is determined so that a COP approaches a substantially maximum value.

Further, a control signal to be output to a servomotor of the air mixing door 34 is determined so that the air mixing door 34 closes the air passage of the vehicle interior condenser 12 and a total flow volume of the blown air that has passed through the vehicle interior evaporator 23 passes through the bypass passage 35.

The control signals and the like determined as described above are output to the various control devices. Thereafter, a control routine of reading the respective detection signals, calculating the target blowing temperature TAO, determining the operation states of the various control devices, and outputting the control signal and so on is repeated in the stated order for each of predetermined control cycles until the operation stop of the vehicle air conditioning apparatus 1 is requested by the operation panel. Meanwhile, the repetition of this control routine is also performed in the same manner at the time of other operation modes.

Figure 11:
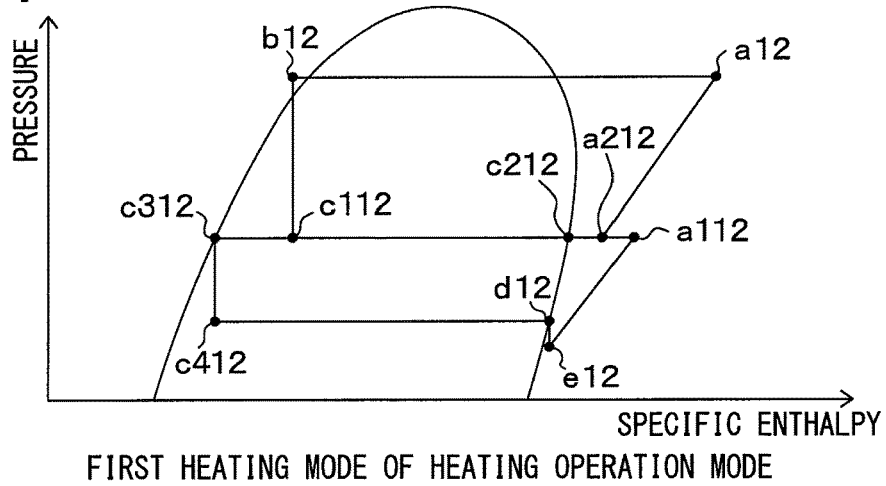
FIG. 11 is a Mollier diagram for illustrating the first heating mode of the heat pump cycle according to the first embodiment.

Therefore, as illustrated in a Mollier diagram of FIG. 11, in the heat pump cycle 10 of the cooling operation mode, the high-pressure refrigerant (point a11 in FIG. 11) discharged from the discharge port 11c of the compressor 11 flows into the vehicle interior condenser 12. At this time, since the air mixing door 34 closes the air passage of the vehicle interior condenser 12, almost all of the refrigerant flowing into the vehicle interior condenser 12 flows out from the vehicle interior condenser 12 without radiating a heat to the vehicle interior blown air.

Since the high-pressure expansion valve 13a is in the fully opened state, the refrigerant that has flowed from the vehicle interior condenser 12 flows into the gas-liquid separator 14 without being almost pressure-reduced by the high-pressure expansion valve 13a. At this time, although the refrigerant flowing into the gas-liquid separator 14 is in a gas-phase state having a degree of superheating, since the intermediate-pressure on-off valve 13b is closed, the refrigerant flows out from the liquid-phase side outflow port 14b without flowing out to the intermediate-pressure refrigerant passage 15 from the gas-phase side outflow port 14c.

The refrigerant that has flowed from the liquid-phase side outflow port 14b of the gas-liquid separator 14 flows into the vehicle exterior heat exchanger 20 without being almost reduced in pressure by the middle stage side pressure reducing unit since the first passage on-off valve 181 of the middle-stage side pressure reducing portion is in the fully opened state.

Figure 10:
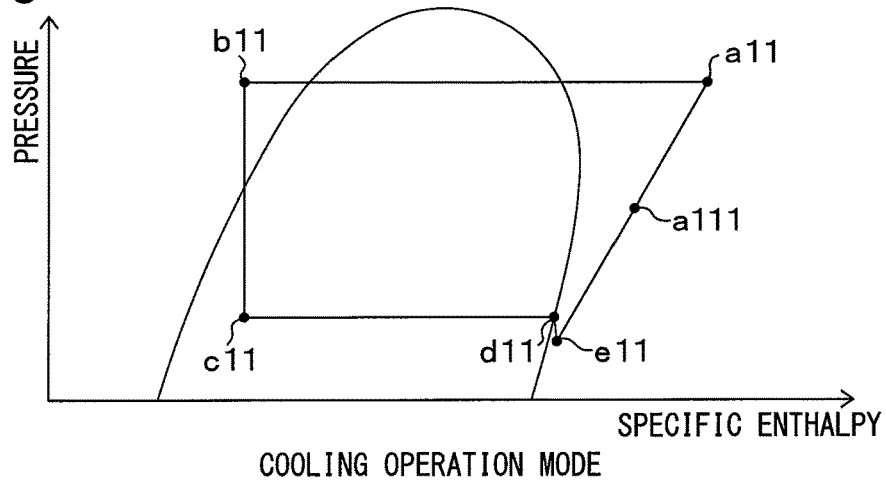
FIG. 10 is a Mollier diagram for illustrating the cooling operation mode of the heat pump cycle according to the first embodiment.

The refrigerant flowing into the vehicle exterior heat exchanger 20 exchanges heat with the outside air blown from the blower fan 21 and radiates the heat (point a11 to point b11 in FIG. 10). Since the second passage on-off valve 251 is in the closed state, the refrigerant that has flowed from the vehicle exterior heat exchanger 20 is isenthalpically reduced in pressure and expanded until the refrigerant flows into the low-pressure expansion valve 22 that is in the throttling state and reaches the low-pressure refrigerant (point b11 to point c11 in FIG. 10).

The refrigerant whose pressure has been reduced by the low-pressure expansion valve 22 flows into the vehicle interior evaporator 23, absorbs heat from the vehicle interior blown air sent from the blower 32, and evaporates (point c11 to d11 in FIG. 10). As a result, the vehicle interior blown air is cooled.

The refrigerant that has flowed from the vehicle interior evaporator 23 flows into the accumulator 24 and is separated into gas and liquid. The separated gas-phase refrigerant is drawn from the intake port 11b (point e11 in FIG. 10) of the compressor 11 and again compressed (point e11, point a111, point a11 in FIG. 10). The liquid-phase refrigerant separated by the accumulator 24 is accumulated in the accumulator 24 as an excessive refrigerant which is not required for exerting the refrigeration capacity required by the cycle.

Figure 12:
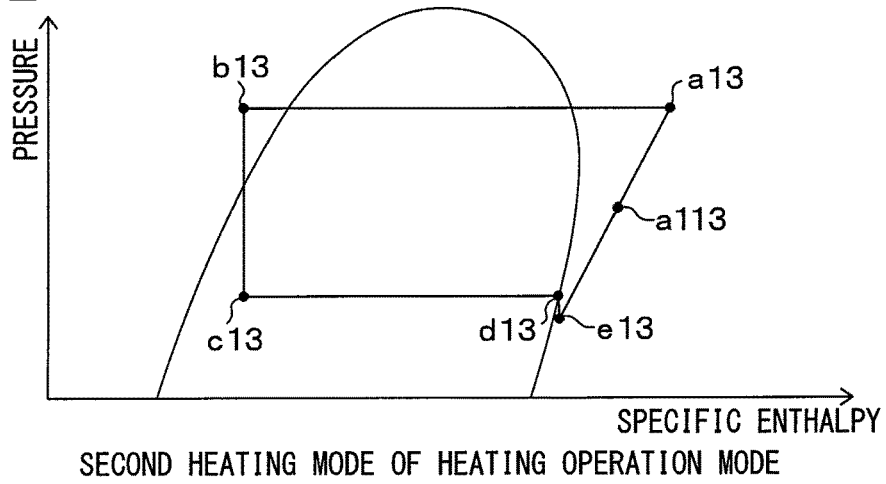
FIG. 12 is a Mollier diagram for illustrating the second heating mode of the heat pump cycle according to the first embodiment.

In this case, the reason that the points d11 and e11 are different from each other in FIG. 12 is because the difference represents a pressure loss occurring in the gas-phase refrigerant flowing through the refrigerant pipe extending from the accumulator 24 to the intake port 11b of the compressor 11, and an endothermic quantity by which the gas-phase refrigerant absorbs the heat from the outside (that is, the outside air). Therefore, in an ideal cycle, it is desirable that the point d11 and the point e11 match each other. The same is applied to the following Mollier diagram.

As described above, in the cooling operation mode, since the air passage of the vehicle interior condenser 12 is closed by the air mixing door 34, the blown air cooled by the vehicle interior evaporator 23 can be blown into the vehicle interior. As a result, the vehicle interior can be cooled. As a result, the vehicle interior can be cooled.

(B) Heating Operation Mode

Next, the heating operation mode will be described. For example, the heating operation mode starts when the heating operation mode is selected by the select switch in a state in which the operation switch of the operation panel turns on (that is, on).

When the heating operation mode is started, the air-conditioning control device 40 reads the detection signal of the sensor group 41 and the operation signal of the operation panel to determine the refrigerant discharge capacity of the compressor 11 (that is, the rotation speed of the compressor 11). Further, the air conditioning control device 40 executes the first heating mode or the second heating mode according to the determined rotation speed.

(B1): First Heating Mode

First, the first heating mode will be described. In the first heating mode, the air-conditioning control device 40 puts the high-pressure expansion valve 13a in the opened state and the throttling state, the intermediate-pressure on-off valve 13b in the fully opened state, the low-pressure expansion valve 22 in the fully closed state, and the second passage on-off valve 251 in the opened state.

Further, the air-conditioning control device 40 puts the first passage on-off valve 181 in the closed state and puts the middle-stage side pressure reducing portion in the throttling state (that is, a state in which the pressure reducing action is exerted). As a result, the heat pump cycle 10 is switched to the refrigerant circuit (that is, the refrigerant circuit of the gas injection cycle) through which the refrigerant flows as indicated by the solid line arrows in FIG. 2.

In the configuration of the refrigerant circuit, the air-conditioning control device 40 reads the detection signals and the like of the sensor group 41 similarly to the cooling operation mode, and determines the operation states of the various control devices connected to an output side of the air conditioning control device 40 based on the target blowing temperature TAO and so on.

The control signal output to the high-pressure expansion valve 13a in the first heating mode is determined so that the refrigerant pressure in the vehicle interior condenser 12 reaches a predetermined target high-pressure, or the degree of subcooling of the refrigerant flowing out from the vehicle interior condenser 12 reaches a predetermined target degree of subcooling. Further, a control signal to be output to a servomotor of the air mixing door 34 is determined so that the air mixing door 34 closes the bypass passage 35 and a total flow volume of the blown air that has passed through the vehicle interior evaporator 23 passes through the vehicle interior condenser 12.

Therefore, as illustrated in FIG. 11, in the heat pump cycle 10 of the first heating mode, the high-pressure refrigerant (point a12 in FIG. 11) discharged from the discharge port 11c of the compressor 11 flows into the vehicle interior condenser 12. The refrigerant that has flowed into the vehicle interior condenser 12 exchanges heat with the vehicle interior blown air that has been blown from the blower 32 and passed through the vehicle interior evaporator 23 to radiate heat (point a12 to point b12 in FIG. 11). Accordingly, the vehicle interior blown air is heated.

The refrigerant that has flowed from the vehicle interior condenser 12 is isenthalpically reduced in pressure and expanded by the high-pressure expansion valve 13a that is in the throttling state until the refrigerant reaches the intermediate-pressure refrigerant (point b12 to point c112 in FIG. 11). The intermediate-pressure refrigerant whose pressure has been reduced by the high-pressure expansion valve 13a flows into the gas-liquid separator 14, and the gas-liquid is separated by the gas-liquid separator 14 (point c12, point c212, point c12, point c312 in FIG. 11).

Because the intermediate-pressure on-off valve 13b is in the opened state, the gas-phase refrigerant separated in the gas-liquid separator 14 flows into the intermediate-pressure refrigerant passage 15 from the gas-phase side outflow port 14c and flows into the intermediate-pressure port 11d of the compressor 11 through the intermediate-pressure refrigerant passage 15 (point c212 in FIG. 11). The refrigerant that has flowed into the intermediate-pressure port 11d merges with the refrigerant (point a112 in FIG. 11) that is in the compression process in the compression chamber 11a (point a212 in FIG. 11), and is compressed in the compression chamber 11a.

On the other hand, the liquid-phase refrigerant separated by the gas-liquid separator 14 flows from the liquid-phase side outflow port 14b to the middle-stage side pressure reducing portion. At this time, since the first passage on-off valve 181 of the middle-stage side pressure reducing portion is in the fully closed state, the refrigerant is reduced in pressure and expanded in an isenthalpic manner by the fixed throttle 17 until the refrigerant reaches the low-pressure refrigerant (point c312 to point c412 in FIG. 11). Then, the refrigerant whose pressure has been reduced by the fixed throttle 17 flows into the vehicle exterior heat exchanger 20, exchanges heat with the outside air blown from the blower fan 21, and absorbs heat (point c412 to point d12 in FIG. 11).

Since the low-pressure expansion valve 22 is in the fully closed state, and the second passage on-off valve 251 is in the opened state, the refrigerant that has flowed from the vehicle exterior heat exchanger 20 flows into the accumulator 24 through the second bypass passage 25 and is separated into gas and liquid. The gas-phase refrigerant that has been separated by the accumulator 24 is drawn from the intake port 11b of the compressor 11 (point e12 in FIG. 11) and is compressed again.

As described above, in the first heating mode, the heat of the refrigerant discharged from the compressor 11 in the vehicle interior condenser 12 can be radiated to the vehicle interior blown air, and the heated internal blown air can be blown into the vehicle interior. As a result, the vehicle interior can be heated.

In the first heating mode, a gas injection cycle in which the low-pressure refrigerant whose pressure has been reduced by the fixed throttle 17 is drawn into the compressor 11 and the intermediate-pressure refrigerant whose pressure has been reduced by the high-pressure expansion valve 13a is merged with the refrigerant that is in the compression process of the compressor 11 can be configured.

This makes it possible to reduce the pressure difference between the intake refrigerant pressure of the compressor 11 and the discharged refrigerant pressure, thereby improving the compression efficiency of the compressor 11. As a result, the COP of the entire heat pump cycle 10 can be improved.

(B2): Second Heating Mode

Next, the second heating mode will be described. In the second heating mode, the air-conditioning control device 40 puts the high-pressure expansion valve 13a in the throttling state, the intermediate-pressure on-off valve 13b in the fully opened state, the low-pressure expansion valve 22 in the fully closed state, and the second passage on-off valve 251 in the opened state.

Further, the air-conditioning control device 40 puts the first passage on-off valve 181 in the opened state and puts the middle-stage side pressure reducing portion in the fully opened state (that is, a state in which the pressure reducing action is not exerted). As a result, the heat pump cycle 10 is switched to a refrigerant circuit in which the refrigerant flows as indicated by the solid line arrows in FIG. 3.

In the configuration of the refrigerant circuit, the air-conditioning control device 40 reads the detection signals and the like of the sensor group 41 and determines the operation states of the respective control devices connected to an output side of the air conditioning control device 40 based on the target blowing temperature TAO and so on. The control signal output to the high-pressure expansion valve 13a in the second heating mode and so on are determined in the same manner as that of the first heating mode.

Therefore, as illustrated in FIG. 12, in the heat pump cycle 10 of the second heating mode, the high-pressure refrigerant (point a13 in FIG. 12) discharged from the discharge port 11c of the compressor 11 flows into the vehicle interior condenser 12 and exchanges heat with the vehicle interior blown air to radiate the heat (point a13 to point b13 in FIG. 12). Accordingly, the vehicle interior blown air is heated.

The refrigerant that has flowed from the vehicle interior condenser 12 is isenthalpically reduced in pressure and expanded by the high-pressure expansion valve 13a that is in the throttling state until the refrigerant reaches the low-pressure refrigerant (point b13 to point c13 in FIG. 12) and flows into the gas-liquid separator 14. As in the cooling operation mode, the refrigerant that has flowed into the gas-liquid separator 14 flows into the vehicle exterior heat exchanger 20 from the liquid-phase side outflow port 14b without flowing out from the gas-phase side outflow port 14c.

The refrigerant that has flowed into the vehicle exterior heat exchanger 20 exchanges heat with the outside air blown from the blower fan 21 and absorbs the heat (point c13 to point d13 in FIG. 12). The subsequent operation is the same as that in the first heating mode, and therefore a description of the subsequent operation will be omitted.

As described above, in the second heating mode, the heat of the refrigerant discharged from the compressor 11 in the vehicle interior condenser 12 can be radiated to the vehicle interior blown air, and the heated vehicle interior blown air can be blown into the vehicle interior. As a result, the vehicle interior can be heated.

Now, the effect of executing the second heating mode in the case where the heating load is relatively low, for example, when the outside air temperature is high with respect to the first heating mode, will be described. In the first heating mode, since the gas injection cycle can be configured as described above, the COP of the entire heat pump cycle 10 can be improved.

That is, theoretically, if the number of revolutions of the compressor 11 is the same, the first heating mode can exhibit a higher heating performance than that in the second heating mode. In other words, the number of revolutions (that is, the refrigerant discharge capacity) of the compressor 11 required for achieving the same heating performance is lower in the first heating mode than in the second heating mode.

However, the compressor 11 has a maximum efficiency rotation speed at which the compression efficiency becomes the maximum (that is, a peak), and when the rotation speed becomes lower than the maximum efficiency rotation speed, the compression efficiency is greatly reduced. For that reason, if the heating load is relatively low and the compressor 11 is operated at a rotation speed lower than the maximum efficiency rotation speed, the COP may be decreased in the first heating mode rather.

Therefore, in the present embodiment, when the rotation speed of the compressor 11 becomes equal to or less than a reference rotation speed during the execution of the first heating mode with the use of the above-described maximum efficiency rotation speed as a reference rotation speed, the first heating mode is switched to the second heating mode. Switching from the second heating mode to the first heating mode may be performed when the rotation speed is equal to or greater than a rotation speed obtained by adding a predetermined amount to the reference rotation speed during the execution of the second heating mode.

As a result, any operation mode capable of exhibiting the higher COP can be selected from the first heating mode and the second heating mode. Accordingly, even when the rotation speed of the compressor 11 becomes equal to or lower than the reference rotation speed during the execution of the first heating mode, the COP of the entire heat pump cycle 10 can be improved by switching the first heating mode to the second heating mode.

In the present embodiment, a detailed description of a dehumidifying heating operation mode in which dehumidification and heating are simultaneously performed will be omitted, but the operation mode can be switched to the dehumidifying and heating operation mode as in the above-mentioned Patent Document 1.

In the vehicle air conditioning apparatus 1 according to the present embodiment as described above, the refrigerant circuit of the heat pump cycle 10 is switched to another, thereby being capable of realizing various cycle configurations and realizing appropriate cooling and heating in the vehicle interior as described above.

In the vehicle air conditioning apparatus 1 applied to an electric vehicle as in the present embodiment, a waste heat of an internal combustion engine (engine) cannot be used for heating the vehicle interior unlike a vehicle equipped with the engine. Therefore, as in the heat pump cycle 10 according to the present embodiment, the cycle is switched to the gas injection cycle and the normal cycle during the heating operation mode, thereby being capable of exerting the high COP regardless of a heating load, which is extremely effective.

Further, in the present embodiment, since the intermediate-pressure on-off valve 13b and the high-pressure expansion valve 13a, which are necessary for causing the heat pump cycle 10 to function as the gas injection cycle, are integrated with each other, the heat pump cycle 10 can be realized with a simple cycle configuration.

Second Embodiment

Figure 13:
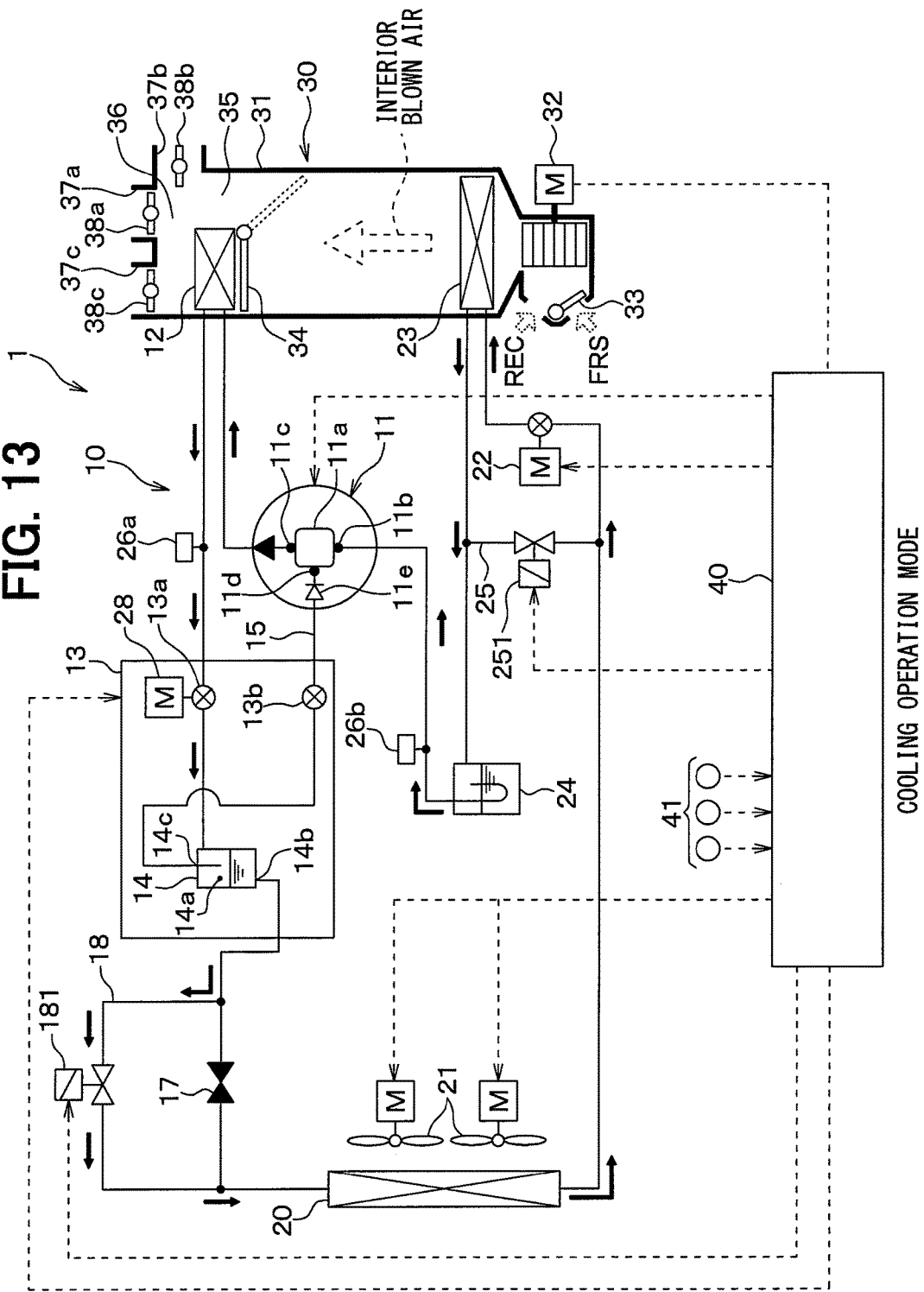
FIG. 13 is an overall configuration diagram illustrating the refrigerant circuit of the heat pump cycle according to the second embodiment.
Figure 14:
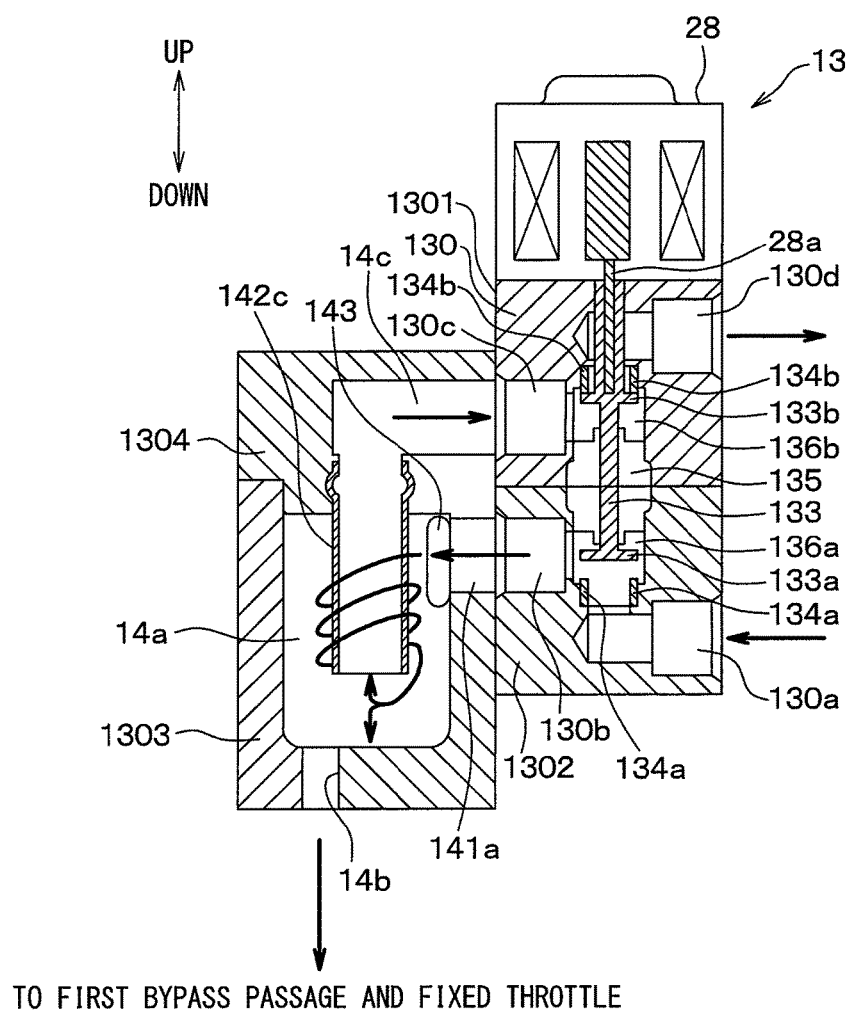
FIG. 14 is a cross-sectional view illustrating a configuration of an integrated valve according to a second embodiment.

An integrated valve 13 according to a second embodiment of the present disclosure will be described with reference to FIGS. 13 and 14. The integrated valve 13 according to the first embodiment is configured as a combination of the high-pressure expansion valve 13a and the intermediate-pressure on-off valve 13b, but as shown in FIG. 13, the integrated valve 13 according to the present embodiment is further constituted by integrating a gas-liquid separator 14 for separating the refrigerant that has flowed from the high-pressure expansion valve 13a into gas and liquid.

A body 130 has a structure in which a first member 1301 on an upper right side, a second member 1302 on a lower right side, a third member 1303 on a lower left side, and a fourth member 1304 on an upper left side are assembled together.

The third member 1303 is formed as a substantially hollow metal block body, and a refrigerant inflow port 141a for allowing a refrigerant that has flowed from the high-pressure expansion valve 13a to flow in the inside is provided in an outer peripheral side wall surface of the third member 1303. The refrigerant inflow port 141a communicates with a gas-liquid separation space (that is, a gas-liquid separation portion) 14a formed inside of the third member 1303. The gas-liquid separation space 14a is formed in a substantially columnar shape whose axis line direction extends in a vertical direction. An O-ring 143 for sealing a liquid leakage of the refrigerant is provided at the refrigerant inflow port 141a.

Further, a refrigerant passage that extends from the refrigerant inflow port 141a to the gas-liquid separation space 14a extends along a tangential direction of an inner peripheral side wall surface of a circular cross-sectional shape of the gas-liquid separation space 14a when viewed from the axial direction (the vertical direction in the present embodiment) of the gas-liquid separation space 14a. Accordingly, the refrigerant that has flowed into the gas-liquid separation space 14a from the refrigerant inflow port 141a flows so as to swirl along the inner peripheral side wall surface of the circular cross section of the gas-liquid separation space 14a.

The gas-liquid of the refrigerant flowing into the gas-liquid separation space 14a is separated by the action of a centrifugal force generated by a swirl flow, and a separated liquid-phase refrigerant drops to a lower side of the gas-liquid separation space 14a by the aid of the action of gravity. In other words, the gas-liquid separation space 14a of the present embodiment configures a centrifugal separation type gas-liquid separation portion.

A lowermost side of the third member 1303 is provided with a separated liquid-phase refrigerant outlet hole 14b for allowing the separated liquid-phase refrigerant to flow out.

The fourth member 1304 is formed as a substantially hollow metal block body. The fourth member 1304 is provided with a gas-phase side outflow port 14c for allowing the gas-phase refrigerant separated in the gas-liquid separation space 14a to flow into the second refrigerant inflow port 130c, a separated gas-phase refrigerant outflow pipe portion 142c for communicating the gas-liquid separation space 14a with the gas-phase side outflow port 14c, and so on.

The separated gas-phase refrigerant outflow pipe portion 142c is formed in a circular tubular shape and is disposed coaxially with the gas-liquid separation space 14a when the fourth member 1304 and the third member 1303 are integrated together. Accordingly, the refrigerant flowing into the gas-liquid separation space 14a swirls around the separated gas-phase refrigerant outflow pipe portion 142c.

In the above-described configuration, the refrigerant flowing into the gas-liquid separation space 14a from the high-pressure expansion valve 13a through the refrigerant inflow port 141a is swirled along the inner peripheral side wall surface of the gas-liquid separation space 14a having the circular cross section.

The gas-liquid of the refrigerant flowing into the gas-liquid separation space 14a is separated by the action of the centrifugal force generated by the swirl flow, and the separated liquid-phase refrigerant drops to a lower side of the gas-liquid separation space 14a and is discharged from the separated liquid-phase refrigerant outlet hole 14b. Further, the gas-phase refrigerant separated in the gas-liquid separation space 14a is introduced into the on-off valve chamber 136b through the gas-phase side outflow port 14c and the second refrigerant inflow port 130c.

The refrigerant having a flow rate corresponding to the valve opening degree of the intermediate-pressure on-off valve 13b is introduced from the open-close valve chamber 136b to an intermediate-pressure port 11d of the compressor 11 through an intermediate-pressure refrigerant passage 15 and a check valve 11e.

In the present embodiment, the same effects as those in the first embodiment can be obtained from the configuration common to the first embodiment.

Further, the integrated valve 13 of the present embodiment is formed by integrating the high-pressure expansion valve 13a, the intermediate-pressure on-off valve 13b, and the gas-liquid separator 14 together. That is, the body 130 is further provided with the gas-liquid separating portion 14a for separating the refrigerant that has flowed from the first refrigerant outflow port 130b into gas and liquid, the gas-phase side outflow port 14c for allowing the gas-phase refrigerant separated by the gas-liquid separation portion 14a to flow out to the second refrigerant inflow port 130c, and the separated liquid-phase refrigerant outlet hole 14b for allowing the liquid-phase refrigerant separated by the gas-liquid separation portion 14a to flow out. As a result, space saving can be achieved.

In the present embodiment, the high-pressure expansion valve 13a, the intermediate-pressure on-off valve 13b, and the gas-liquid separator 14 are integrated together. Alternatively, at least one of a first passage on-off valve 181 that opens and closes a first bypass passage 18 that bypasses a fixed throttle 17 and introduces the liquid-phase refrigerant flowing out from the gas-liquid separator 14 to the exterior heat exchanger 20 side and the fixed throttle 17 may be integrated with the above components.

Although the embodiments of the present disclosure have been described above, the present disclosure is not limited to the above-described embodiments, and can be appropriately modified. For example, the present disclosure can be variously modified as follows.

(1) In each of the embodiments described above, the example in which the heat pump cycle 10 of the present disclosure is applied to the vehicle air conditioning apparatus 1 for the electric vehicle has been described, but the present disclosure is not limited to the above example. For example, the present disclosure may be applied to an air conditioning apparatus of a vehicle in which an engine waste heat may be insufficient such as hybrid vehicles.

(2) In each of the embodiments described above, the example in which the heat pump cycle 10 of the present disclosure is applied to the vehicle air conditioning apparatus 1 has been described, but the application of the present disclosure is not limited to the above example. For example, the present disclosure may be applied to a stationary air conditioning apparatus, a liquid heating device (for example, a water heater) or the like.

(3) In each of the embodiments described above, the shaft 133 is driven in the vertical direction with the use of the stepping motor 28 as an actuator. However, the shaft 133 may be driven in the vertical direction with the use of a drive unit other than the stepping motor 28.

(4) In each of the embodiments described above, the configuration in which the check valve 11e is provided in the compressor 11 is described, but a check valve 11e may be provided outside of the compressor 11.

(5) In the above-described respective embodiments, elements configuring the embodiments are not necessarily indispensable as a matter of course, except when the elements are particularly specified as indispensable and the elements are considered as obviously indispensable in principle.

(6) In the above-described respective embodiments, when numerical values such as the number, figures, quantity, and a range of configuration elements in the embodiments are described, the numerical values are not limited to a specific number, except when the elements are particularly specified as indispensable and the numerical values are obviously limited to the specific number in principle.

(7) In the above-described respective embodiments, when a shape, and a positional relationship of the configuration elements are described, the configuration elements are not limited to the shape, and the positional relationship, except when the configuration elements are particularly specified and are limited to a specific shape, and positional relationship in principle.

Remarks

In this case, in the heat pump cycle that combines the technique of Patent Document 1 with the technique of Patent Document 2, a fact that the following two problems may occur will be described.

(1) There is a case in which the intermediate-pressure refrigerant passage cannot be drawn to vacuum during the refrigerant filling operation.

(2) There is a case in which the intermediate-pressure refrigerant passage cannot be filled with the refrigerant during the refrigerant filling operation.

Figure 15:
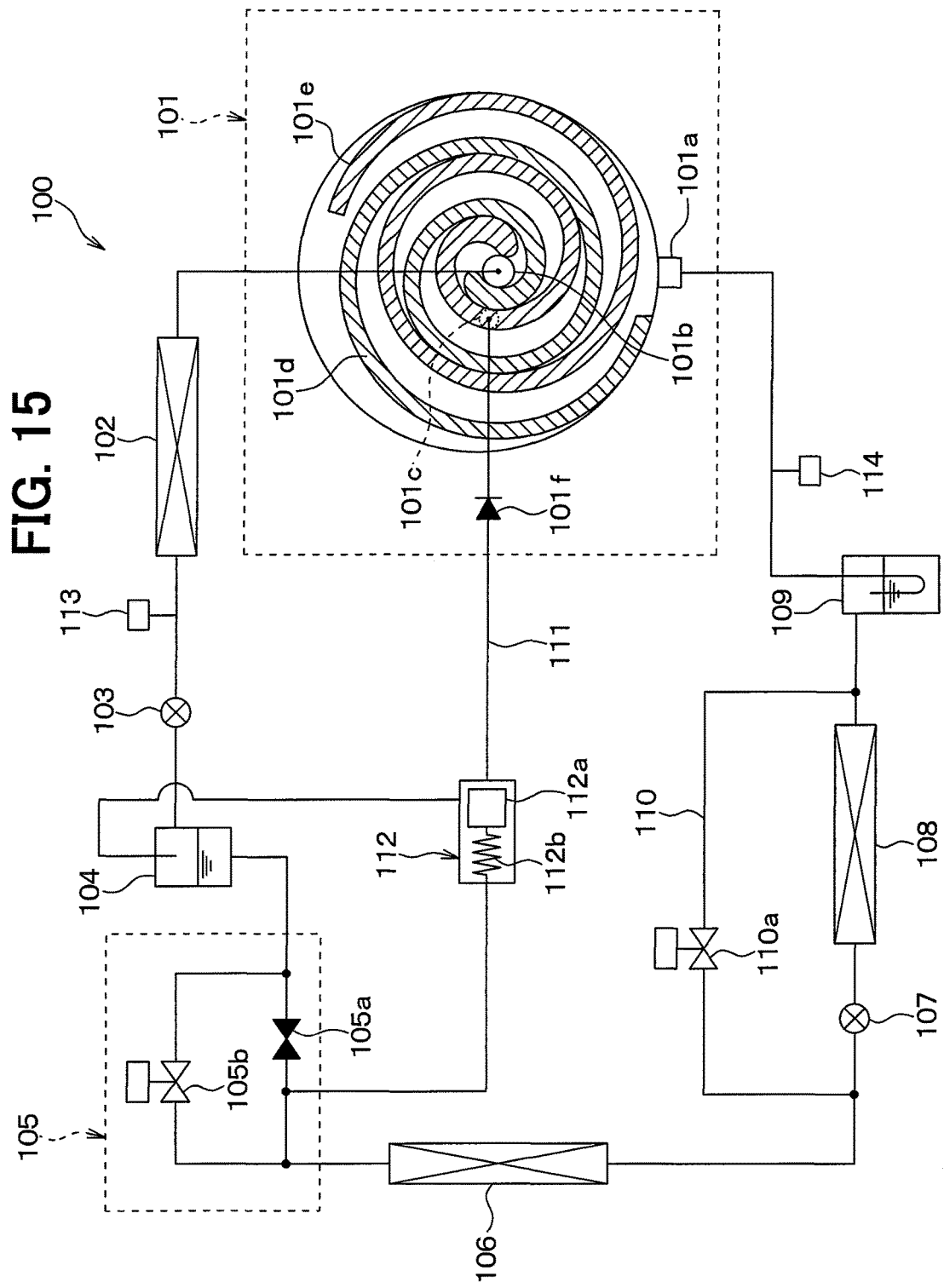
FIG. 15 is a schematic diagram illustrating a heat pump cycle according to a study example.

FIG. 15 is a schematic diagram illustrating a configuration (hereinafter referred to as "study example") in which the scroll-type compressor disclosed in Patent Document 2 is applied to a heat pump cycle capable of switching between the gas injection cycle and the normal cycle.

First, each component of the study example will be briefly described. A heat pump cycle 100 according to the study example includes a scroll-type compressor 101. The scroll-type compressor 101 compresses a refrigerant drawn from an intake port 101a and discharges the compressed refrigerant from a discharge port 101b. Further, the scroll-type compressor 101 includes an intermediate-pressure port 101c for allowing an intermediate-pressure refrigerant in a cycle to flow into and merge with a refrigerant that is in a compression process.

Like Patent Document 2, the compressor 101 is configured to periodically open and close the intermediate-pressure port 101c by the aid of tooth tips of a movable scroll 101e abutting against an end plate portion of the fixed scroll 101d. It is to be noted that the compressor 101 is provided with a check valve 101f for preventing backflow of the refrigerant from the intermediate-pressure port 101c to an intermediate-pressure refrigerant passage 111 side to be described later.

The discharge port 101b side of the compressor 101 is connected with a radiator 102, a first pressure reducing portion 103, and a gas-liquid separator 104 in order from the upstream side. The outlet side of a liquid-phase refrigerant in the gas-liquid separator 104 is provided a fixed throttle 105a that functions as a second pressure reducing portion 105 and an on-off valve 105b of a bypass flow channel that bypasses the fixed throttle 105a and allows the refrigerant to flow.

Further, the outlet side of the second pressure reducing portion 105 is connected with an vehicle exterior heat exchanger 106 for allowing the refrigerant to exchange heat with the outside air, a third pressure reducing portion 107 for reducing the pressure of the refrigerant that has flowed from the vehicle exterior heat exchanger 106, an evaporator 108, an accumulator 109 for separating the refrigerant flowing out from the evaporator 108 into gas and liquid. The outlet side of the vehicle exterior heat exchanger 106 is provided with an on-off valve 110a for opening and closing a bypass flow channel 110 for bypassing the third pressure reducing portion 107 and the evaporator 108 and allowing the refrigerant to flow in the accumulator 109.

Further, the gas-liquid separator 104 is connected with an intermediate-pressure refrigerant passage 111 for guiding the separated gas-phase refrigerant to the intermediate-pressure port 101c of the compressor 101. The intermediate-pressure refrigerant passage 111 is provided with a differential pressure on-off valve 112 that opens the intermediate-pressure refrigerant passage 111 when a differential pressure across the fixed throttle 105a becomes equal to or higher than a predetermined pressure.

Figure 16:
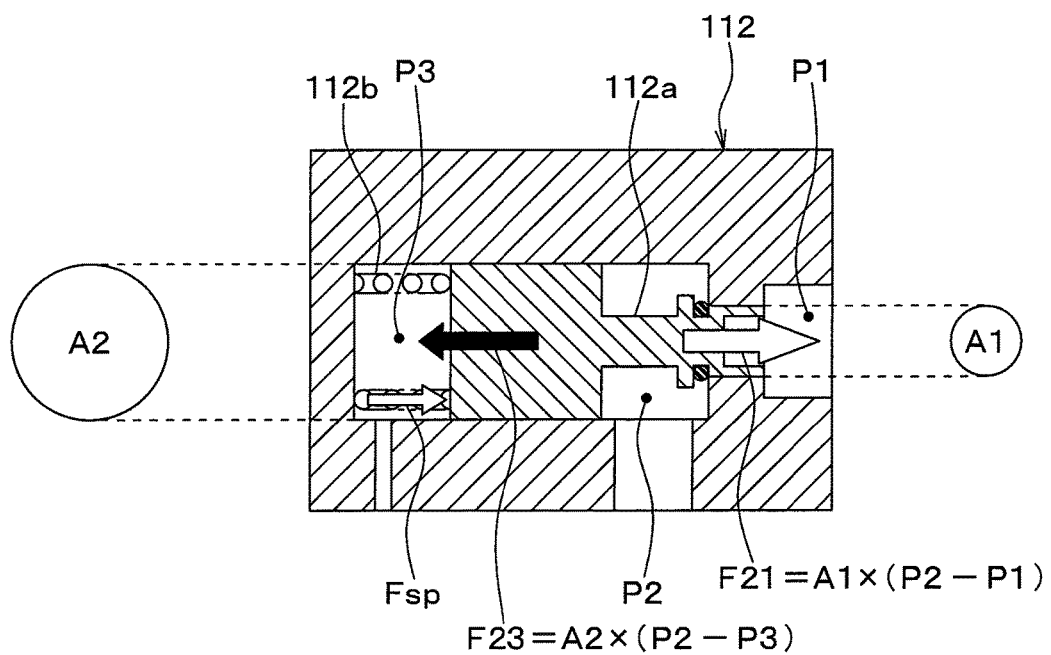
FIG. 16 is a diagram for illustrating opening and closing operation of a differential pressure on-off valve according to the study example.

More specifically, as illustrated in FIG. 16, the differential pressure on-off valve 112 includes a valve element 112a for opening and closing the intermediate-pressure refrigerant passage 111, a spring 112b for applying a load to the valve element 112a on the side closing the intermediate-pressure refrigerant passage 111, and so on.

Returning to FIG. 15, the heat pump cycle 100 is provided with a first filling port 113 for filling the high-pressure refrigerant passage in the cycle with the refrigerant and a second filling port 114 for filling the low-pressure refrigerant passage in the cycle with the refrigerant. The first filling port 113 also functions as an evacuating port.

The heat pump cycle 100 is described above. The factors of occurrence of the aforementioned problem (1) will be described below. In the heat pump cycle 100, evacuating is performed through the first filling port 113 in a state where the function valves such as the on-off valves 105*b*, 110*a* and the like are set in a fully opened state.

In the evacuating process, portions other than the intermediate-pressure refrigerant passage 111 can be drawn to vacuum, but in the following case, the intermediate-pressure refrigerant passage 111 cannot be drawn to vacuum.

In other words, as illustrated in the compressor 101 of FIG. 15, if the intermediate-pressure port 101*c* is closed by a tooth tip of a movable scroll 101*e* inside the compressor 101, evacuating cannot be implemented from the intermediate-pressure port 101*c* side of the compressor 101.

On the other hand, it is conceivable that the evacuation is performed from the differential pressure on-off valve 112 side. However, when evacuation is performed, the pressures before and after the fixed throttle 105*a* becomes almost zero, the intermediate-pressure refrigerant passage 111 does not open due to an urging force of the spring 112*b*, and evacuation cannot be implemented through the differential pressure on-off valve 112.

As described above, in the heat pump cycle 100 of FIG. 15, when the intermediate-pressure port 101*c* is closed inside the compressor 101 in the evacuating process at the time of filling the refrigerant, the intermediate-pressure refrigerant passage 111 cannot be implemented. Meanwhile, the problem (1) occurs not only in the scroll-type compressor 101 but also in the compressor in which the intermediate-pressure port 101*c* may be internally closed.

Next, the factor of occurrence of the problem (2) will be described. After completion of the evacuating process in the heat pump cycle 100, a specified amount of refrigerant is filled through at least one of the filling ports 113 and 114.

In the filling process, the differential pressure on-off valve 112 does not open and the refrigerant cannot be sealed in the refrigerant passage from the differential pressure on-off valve 112 in the intermediate-pressure refrigerant passage 111 to the check valve 101*f* of the compressor 101.

This phenomenon will be described with reference to FIG. 16. As illustrated in FIG. 16, a force F23 due to a differential pressure across the fixed throttle 105*a* acts on the valve element 112*a* of the differential pressure on-off valve 112 in the valve opening direction. In addition, a force F21 due to a differential pressure between the intermediate-pressure port 101*c* side of the intermediate-pressure refrigerant passage 111 and an upstream side of the fixed throttle 105*a* and an urging force Fsp of the spring 112*b* act on the valve element 112*a* in the valve closing direction.

The valve opening force F of the differential pressure on-off valve 112 can be defined by the following expression, and is opened under the condition that the valve opening force F>0, and the heat pump cycle 100 is switched to the gas injection cycle.

$$F=F23-F21-Fsp=A2\times(P2-P3)-A1\times(P2-P1)-Fsp \quad [\text{Ex. 1}]$$

In the expression, "P1" is a pressure on the intermediate-pressure port 101*c* side of the intermediate-pressure refrigerant passage 111, "P2" is a pressure on the upstream side of the fixed throttle 105*a*, and "P3" is a pressure on the downstream side of the fixed throttle 105*a*. Also, "A1" is an area of a portion where the pressures P1 and P2 act on the valve element 112*a*, and "A2" is an area of a portion where the pressures P2 and P3 act on the valve element 112*a*.

However, if the intermediate-pressure refrigerant passage 111 is in the vacuum state (P1≈0) in the evacuating process, F21 acting on the valve element 112*a* of the differential pressure on-off valve 112 in the valve closing direction increases, and the differential pressure on-off valve 112 may not open due to the differential pressure generated by the cycle operation.

What is claimed is:

1. An integrated valve for a heat pump cycle including a compressor that compresses a refrigerant received from an intake port and discharges the refrigerant from a discharge port, the compressor including an intermediate-pressure port through which an intermediate-pressure refrigerant flows from the heat pump cycle into the compressor and is merged with the refrigerant being in a compression process, the heat pump cycle including a check valve that prevents a backward flow of the refrigerant flowing into the intermediate-pressure port, the heat pump cycle being switchable between a gas injection cycle that is a two-stage compression cycle and a normal cycle that is a single-stage compression cycle, the integrated valve comprising:

a body having a pressure reducing chamber in which a pressure of the refrigerant discharged from the compressor is reduced, and an on-off valve chamber in which a flow channel of the refrigerant flowing into the intermediate-pressure port through an intermediate-pressure refrigerant passage and through the check valve is opened or closed;

a connecting member including a first valve element that is disposed in the pressure reducing chamber and forms a pressure reducing valve that reduces the pressure of the refrigerant discharged from the compressor, and a second valve element disposed in the on-off valve chamber and forming an on-off valve that adjusts a flow rate of the refrigerant flowing into the intermediate-pressure port, the first valve element and the second valve element being connected to each other such that the on-off valve is in a fully opened state when the pressure reducing valve is in a throttling state, the on-off valve is in an opened state when the pressure reducing valve is in an opened state, and the on-off valve is in a closed state when the pressure reducing valve is in a fully opened state; and a motor configured to drive the connecting member.

2. The integrated valve according to claim 1, wherein the body has a first refrigerant outflow port through which the refrigerant reduced in pressure in the decompression chamber flows out toward a gas-liquid separation portion that separates the refrigerant into a gas-phase refrigerant and a liquid-phase refrigerant, and a flow channel portion located between the first refrigerant outflow port and a valve seat that is disposed in the pressure reducing chamber and forms the pressure reducing valve is next to the on-off valve chamber while a guide member that guides the connecting member is located between the flow channel portion and the on-off valve chamber.

3. The integrated valve according to claim 1, wherein the body includes a gas-liquid separation portion that separates gas and liquid of the refrigerant flowing from the first refrigerant outflow port, a gas-phase side outflow port through which a gas-phase refrigerant separated by the gas-liquid separation portion is introduced into the on-off valve chamber, and a liquid-phase side outflow port from which the liquid-phase refrigerant separated by the gas-liquid separation portion flows out.

4. A heat pump cycle switchable between a gas injection cycle that is a two-stage compression cycle and a normal cycle that is a single-stage compression cycle, the heat pump cycle comprising:

a compressor that compresses a refrigerant received from an intake port of the compressor and discharges the refrigerant from a discharge port of the compressor, the compressor including an intermediate-pressure port through which an intermediate-pressure refrigerant flows from the heat pump cycle into the compressor and is merged with the refrigerant being in a compression process;

a check valve that prevents a backward flow of the refrigerant flowing into the intermediate-pressure port;

an integrated valve that reduces a pressure of the refrigerant discharged from the discharge port;

a gas-liquid separation portion that separates gas and liquid of the refrigerant which has been reduced in pressure by the integrated valve; and an intermediate-pressure refrigerant passage that guides a gas-phase refrigerant separated by the gas-liquid separation portion to the intermediate-pressure port, wherein the integrated valve comprises:

a body having a pressure reducing chamber in which a pressure of the refrigerant discharged from the compressor is reduced, and an on-off valve chamber in which a flow channel of the refrigerant flowing into the intermediate-pressure port through the intermediate-pressure refrigerant passage and through the check valve is opened or closed;

a connecting member including a first valve element that is disposed in the pressure reducing chamber and forms a pressure reducing valve that reduces the pressure of the refrigerant discharged from the compressor, and a second valve element disposed in the on-off valve chamber and forming an on-off valve that opens or closes a flow channel of the refrigerant flowing into the intermediate-pressure port, the first valve element and the second valve element being connected to each other such that the on-off valve is in a fully opened state when the pressure reducing valve is in a throttling state, the on-off valve is in an opened state when the pressure reducing valve is in an opened state, and the on-off valve is in a closed state when the pressure reducing valve is in a fully opened state; and a motor configured to drive the connecting member.

* * * * *